(12) United States Patent
Brooks et al.

(10) Patent No.: US 10,040,491 B2
(45) Date of Patent: Aug. 7, 2018

(54) VEHICLE AIRFLOW CONTROL APPARATUS

(71) Applicant: ASTON MARTIN LAGONDA LIMITED, Warwickshire (GB)

(72) Inventors: James Brooks, Warwickshire (GB); Grant Hastie, Warwickshire (GB); Richard Wilcox, Warwickshire (GB); Andrew Kirk, Warwickshire (GB); Dean Smart, Warwickshire (GB); Benn Matcham, Warwickshire (GB); Andrew McAllister, Warwickshire (GB); Darren Coe, Warwickshire (GB)

(73) Assignee: Aston Martin Lagonda Limited (GB)

( * ) Notice: Subject to any disclaimer, the term of this patent is extended or adjusted under 35 U.S.C. 154(b) by 0 days.

(21) Appl. No.: 15/518,727

(22) PCT Filed: Oct. 14, 2015

(86) PCT No.: PCT/GB2015/053027
§ 371 (c)(1),
(2) Date: Apr. 12, 2017

(87) PCT Pub. No.: WO2016/059402
PCT Pub. Date: Apr. 21, 2016

(65) Prior Publication Data
US 2017/0240226 A1    Aug. 24, 2017

(30) Foreign Application Priority Data
Oct. 14, 2014    (GB) .................................. 1418197.8

(51) Int. Cl.
*B62D 35/00*    (2006.01)
*B62D 25/24*    (2006.01)
(Continued)

(52) U.S. Cl.
CPC ........... *B62D 35/007* (2013.01); *B62D 25/24* (2013.01); *B62D 37/02* (2013.01); *F15D 1/0055* (2013.01)

(58) Field of Classification Search
CPC ...... B62D 25/24; B62D 35/00; B62D 35/007; B62D 37/02; F16D 1/0055
(Continued)

(56) References Cited

U.S. PATENT DOCUMENTS 8,196,996 B1 * 6/2012 Campbell ............ B62D 35/001
296/180.1
9,662,967 B2 * 5/2017 Rutschmann .......... B60K 13/02
(Continued)

FOREIGN PATENT DOCUMENTS

EP    0467523 A2    1/1992
EP    1048556 A1    11/2000
(Continued)

*Primary Examiner* — Gregory A Blankenship
(74) *Attorney, Agent, or Firm* — Dorsey & Whitney LLP

(57) ABSTRACT

A vehicle airflow control apparatus (900) has an air inlet (902) at the rear quarter glass (906) of the vehicle and ducting (908) leading via an openable joint (912) and rear ducting (912) past a bend (916) to an exit blowing aperture (918), a concertina element (928) allowing duct movement, the openable joint having a self-alignment cup (938) with wedging inner sides (944, 946), an interface seal connecting the rear ducting and the cup, a deployable spoiler (920) having a drive system (978), 10 outboard positional control of the spoiler being provided by a rod (998) with cone surfaces (1000, 1002).

20 Claims, 20 Drawing Sheets

(51) Int. Cl.
 *B62D 37/02* (2006.01)
 *F15D 1/00* (2006.01)

(58) Field of Classification Search
 USPC .......................................... 296/180.1, 180.5
 See application file for complete search history.

(56) References Cited

U.S. PATENT DOCUMENTS

| | | | | |
|---|---|---|---|---|
| 2016/0251041 | A1* | 9/2016 | Wolf | B62D 35/007 |
| | | | | 296/180.1 |
| 2017/0225623 | A1* | 8/2017 | Gaylard | B60R 3/02 |
| 2017/0240221 | A1* | 8/2017 | Gaylard | B62D 35/005 |
| 2017/0240222 | A1* | 8/2017 | Gaylard | B62D 35/005 |
| 2017/0240223 | A1* | 8/2017 | Gaylard | B62D 35/005 |
| 2017/0240224 | A1* | 8/2017 | Gaylard | B62D 35/005 |
| 2017/0240226 | A1* | 8/2017 | Brooks | B62D 35/007 |

FOREIGN PATENT DOCUMENTS

| | | |
|---|---|---|
| EP | 1506911 B1 | 10/2007 |
| EP | 1907267 B1 | 9/2009 |
| FR | 2885343 A1 | 11/2006 |
| GB | 2512889 A | 10/2014 |
| WO | 2013186130 A1 | 12/2013 |
| WO | 2014167339 A1 | 10/2014 |

\* cited by examiner

VEHICLE AIRFLOW CONTROL APPARATUS

TECHNICAL FIELD

The present invention relates to vehicle airflow control apparatus, for example such apparatus for land vehicles such as motor cars.

BACKGROUND

A motor car has to function as a product of good engineering while in most cases also being aesthetically pleasing. There is often a conflict of interest between designers and aerodynamicists when deciding on the form of the vehicle. With high speed motor cars, such as those capable of exceeding 200 or even 300 kilometres per hour, lift can be generated in the region of the rear "axle" area and such fast motor cars require a low co-efficient of lift to prevent them from losing grip in corners and so as to avoid undesirable driving characteristics.

It is also desirable for a motor car to have relatively low drag so that it is economical and/or can travel faster with a motor/engine providing a given power to the power train.

One aerodynamic device used is a rear "flip". Some of the earliest effective motor cars to use these devices were the Ferrari 250 GTO, and the Aston Martin DP214 and DP215 racing cars which in the year 1963 where the first motor cars ever to be officially timed at over 300 kph on the very long Mulsanne Straight at Le Mans. More recently, boot lid flips have become relatively common among production cars and are included on, for example, the Aston Martin DBS, BMW Z4 and Mercedes Benz SLK55 AMG models.

Another aerodynamic device is a deployable spoiler such as used on the Bugatti Veyron Super Sport at the rear of the vehicle. Another known aerodynamic device is a fixed wing at the rear of the vehicle such as used on the Aston Martin V12 Zagato and Mercedes Benz C63 AMG Black Series models. Another aerodynamic device is a Gurney flap which is an element which may be fixed to the top trailing edge of a wing on a racing car and has been used since the 1970s.

FR-A-2885343 discloses the use of blowing slots on an MPV or hatchback with a flat roof. EP-A-1506911 shows air blown out near a rear windscreen of a hatchback. EP-A-1907267 shows a motor car having a horizontal opening for air which has passed a cooling duct. EP-A-1048556 shows an apparatus for emitting air up next to and behind a substantially vertical drop surface behind a substantially horizontal boot lid—a rather unsightly arrangement due to the exterior nature of the apparatus. EP-A-0467523 discloses air passageways inclined upwards and with baffles disposes in the passageways.

While some of these devices can be useful to greater or lesser extents from an aerodynamic performance perspective, they do not always fit in with the objects which vehicle designers may be attempting to achieve from an aesthetic perspective on some projects. Some vehicle designers may desire very clean lines for the shape of their vehicles, at least when the vehicles are on display or stationary and without a substantial and/or complex arrangements. It is very challenging to engineer a vehicle which is capable of very high speed with good vehicle response and stability across the road speed range during straight line and cornering manoeuvres while also meeting vehicle aesthetic design objectives.

SUMMARY

It is difficult to provide a practical implementation, for example which works well in different weather conditions, including wind and rain, which is easily installable.

The present invention aims to alleviate at least to a certain extent the problems of the prior art. Alternatively, the invention aims to provide a useful apparatus.

According to one aspect of the present disclosure there is provided a vehicle airflow control apparatus comprising an air blowing arrangement located at or in a vehicle body surface (and preferably near a rear of the vehicle body surface) for blowing air into flow passing the vehicle, the air blowing arrangement having at least two exit apertures, the blowing arrangement including a surface member configured to be positioned (optionally in front of and) adjacent at least one said exit aperture with the surface member extending, in an extended configuration thereof, generally away from the vehicle body surface and extending laterally across the vehicle body surface, wherein at least two said exit apertures are connected by separate ducting to separate air inlets.

This ensures that, even when subjected to cross winds or cornering, separate flows may be provided to separate exit apertures. This helps to avoid a cross wind of flow through the apparatus and assists in ensuring that the exit apertures are all aerodynamically operable and useful.

The at least one said exit aperture may be arranged for connection by the ducting to an air inlet on a right side of the vehicle body surface and a further at least one said exit aperture may be arranged for connection by the ducting to an air inlet on a left side of the vehicle body surface.

The blowing arrangement may be configured with at least one said exit aperture located in a movable vehicle surface panel (such as a rear decklid) which is movable relative to a fixed portion of vehicle bodywork, the ducting having an openable joint for permitting movement between the vehicle surface panel and the fixed portion of vehicle bodywork.

The joint may be located above a drainable section of the fixed vehicle of the section, such as a trunk lid surround or a surface in front of a luggage space opening.

The openable joint may include a wedge-shaped cup on one ducting element and a connector portion on another ducting element which is arranged to engage in the wedge-shaped cup; and optionally in which at least one of the wedge-shaped cup and the connector portion may be formed of rubber or rubber-like material. In this case, the cup may be located generally or substantially fixed in position above a trunk lid surround surface and with the connector portion secured to a B-surface side of a vehicle rear decklid. The wedge-shaped cup may be arranged to be located below the connector portion with a drain portion of the wedge-shaped cup being located above the trunk lid surround surface.

The ducting may have at least one flexible portion thereof. The flexible portion may comprise a concertina element.

The ducting may have an air inlet which generally has a larger height than width and in which the ducting may have at least a portion thereof spaced from said air inlet which has a larger width than height.

Cross sectional area of air flow through the ducting may be substantially constant from an air inlet to a said exit aperture; the cross-sectional area of airflow optionally varying from a mean value thereof by less than plus or minus 50% all of the way along from the inlet to the said exit aperture, for example by less than 40%, less than 25%, less than 15%, less than 10% or less than 5%.

The ducting may have at least one water drain configured to be positioned at a low point of the ducting.

The ducting may be configured with internal surfaces thereof contoured, for example sloped, so as to drain from all points therein either to the air inlet or to the water drain.

The apparatus may include a water shedder arrangement configured to be positioned below the vehicle body surface in order to divert water, such as rainwater, away from a space, such as a luggage compartment, located below the water shedder arrangement.

The water shedder arrangement may include at least one plate-like surface. The ducting may be located passing through the plate-like surface.

The apparatus may include an actuator for extending and retracting the surface member relative to the vehicle body surface.

The actuator, which may include a drive screw, may be arranged for drive of the surface member at a single central location, for example for driving the surface member between extended and retracted configurations thereof relative to an adjacent or surrounding vehicle body surface.

The apparatus may include an alignment system for aligning the surface member relative to the vehicle body surface in at least a raised or lowered configuration thereof. In this case, the alignment system may include a conical surface fixed relative to one of the vehicle body surface and the surface member which is adapted to engage with an aperture fixed relative to the other of the vehicle body surface and the surface member.

The blowing arrangement may be passive, having airflow through the ductwork generated solely by motion relative to surrounding air. Alternatively, at least one fan may be provided for powering air through the ducting.

The surface member may be forwardly concave. The curvature thereof may follow the shape of a nearby body feature, such as the shape of a rear dropline of a rear decklid of a vehicle.

The surface member may be linearly movable between extended and retracted configurations thereof; optionally being so linearly movable in a direction substantially normal to an adjacent region of the vehicle body surface.

The surface member may have a cover flange arranged to overlie at least a portion of a said exit aperture when the surface member is located in a retracted configuration thereof.

A further aspect of the present disclosure provides a vehicle airflow control apparatus comprising an air blowing arrangement located at or in a vehicle body surface (and preferably near a rear of the vehicle body surface) for blowing air into flow passing the vehicle, in which the blowing arrangement is configured with at least one exit aperture thereof located in a movable vehicle surface panel (such as a rear decklid) which is movable relative to a fixed portion of vehicle bodywork, the ducting having an openable joint for permitting movement between the vehicle surface panel and the fixed portion of vehicle bodywork.

This enables a practical system. For example, when the vehicle surface panel comprises a decklid, this enables the decklid to be opened and closed.

The joint may be located above a drainable section of the fixed portion of vehicle bodywork, such as a trunk lid surround or a surface in front of a luggage space opening. This therefore provides good rainwater integrity since the arrangement is unlikely to leak water into a luggage compartment below the decklid.

The openable joint may include a wedge-shaped cup on one ducting element and a connector portion on another ducting element which is arranged to engage in the wedge-shaped cup. The wedge-shaped cup enables a good water and air-tight seal.

At least one of the wedge-shaped cup and the connector portion may be formed of rubber or rubber-like material. This allows a good water and air-tight seal. The rubber or rubber-like material may compress somewhat to achieve this.

The cup may be located generally or substantially fixed in position above a trunk lid surround surface. The connector portion may be secured to a B-surface side of a vehicle rear decklid. The decklid may be configured to rotate about a hinge system relative to a fixed portion of vehicle bodywork. The hinge system may comprise a single hinge located so as to ensure that, during hinging movement of the connector portion, the connector portion remains above or forward of a trunk lid surround surface of the vehicle. This helps ensure that water such as rain water does not drain into a luggage compartment below the decklid when the decklid is opened for access to the luggage compartment.

The wedge-shaped cup may be arranged to be located below the connector portion with a drain portion of the wedge-shaped cup being located above the trunk lid surround surface.

A further aspect of the present disclosure provides airflow control apparatus comprising an air blowing arrangement located at or in a vehicle body surface (and preferably near a rear of the vehicle body surface) for blowing air into flow passing the vehicle, in which ducting is provided having at least one flexible portion thereof. This assists in ensuring easily installation of the apparatus.

The flexible portion may comprise a concertina element.

A further aspect of the present disclosure provides a vehicle airflow control apparatus comprising an air blowing arrangement located at or in a vehicle body surface (and preferably near a rear of the vehicle body surface) for blowing air into flow passing the vehicle, and in which ducting is provided which has an air inlet which generally has a larger height than width and in which the ducting has at least a portion thereof spaced from said air inlet which has a larger width than height. This enables the inlet to be positioned near a generally upright surface of a vehicle, such as adjacent to a vehicle window near a B or C pillar, yet also enables the ducting to pass over a luggage compartment without taking up a great vertical extent, thereby optimising vehicle luggage capacity.

A further aspect of the present disclosure provides a vehicle airflow control apparatus comprising an air blowing arrangement located at or in a vehicle body surface (and preferably near a rear of the vehicle body surface) for blowing air into flow passing the vehicle, in which ducting is provided and in which cross sectional area of air flow through the ducting is substantially constant from an air inlet to an exit aperture of the blowing arrangement; the cross-sectional area of airflow optionally varying from a mean value thereof by less than plus or minus 50% all of the way along from the inlet to the said exit aperture, for example by less than 40%, less than 25%, less than 15%, less than 10% or less than 5%. This enables a smooth flow of air through the ducting with little acceleration or deceleration and small increases and decreases in pressure.

A further aspect of the present disclosure provides a vehicle airflow control apparatus comprising an air blowing arrangement located at or in a vehicle body surface (and preferably near a rear of the vehicle body surface) for blowing air into flow passing the vehicle, and in which ducting is provided, the ducting having at least one water drain configured to be positioned at a low point of the ducting. This enables the apparatus to have good rainwater integrity.

The ducting may be configured with internal surfaces thereof contoured, for example sloped, so as to drain from all points therein either to the air inlet or to the water drain.

A further aspect of the present disclosure provides a vehicle airflow control apparatus comprising an air blowing arrangement located at or in a vehicle body surface (and preferably near a rear of the vehicle body surface) for blowing air into flow passing the vehicle, and which includes a water shedder arrangement configured to be positioned below the vehicle body surface in order to divert water, such as rainwater, away from a space, such as a luggage compartment, located below the water shedder arrangement. This enables the apparatus to have good rainwater integrity.

The water shedder arrangement may include at least one plate-like surface and in which the ducting is located passing through the plate-like surface.

A further aspect of the present disclosure provides a vehicle airflow control apparatus comprising an air blowing arrangement located at or in a vehicle body surface (and preferably near a rear of the vehicle body surface) for blowing air into flow passing the vehicle, the blowing arrangement including a surface member configured to be positioned adjacent (such as in front of, in the direction of flow) at least one exit aperture of the blowing arrangement with the surface member extending, in an extended configuration thereof, laterally across the vehicle body surface, and which includes an actuator for extending and retracting the surface member relative to the vehicle body surface, the actuator, which may include a drive screw, being arranged for drive of the surface member at a single central location. This enables a reliable system for actuating the surface member while using only one motor.

The apparatus may include an alignment system for aligning the surface member relative to the vehicle body surface in at least a raised or lowered configuration thereof; the alignment system optionally including a conical surface fixed relative to one of the vehicle body surface and the surface member which is adapted to engage with an aperture fixed relative to the other of the vehicle body surface and the surface member. This enables good alignment of the surface member when it is located in a raised extended configuration or a lowered retracted configuration thereof, in a simple way and using only one motor. Also, the location of the conical surface/aperture relative to one another may be easily tuned during vehicle assembly to cleanly set the extended and retracted configurations.

A further aspect of the present disclosure provides vehicle airflow control apparatus comprising an air blowing arrangement located at or in a vehicle body surface (and preferably near a rear of the vehicle body surface) for blowing air into flow passing the vehicle, the blowing arrangement including a surface member configured to be positioned adjacent (such as in front of, in the direction of flow) at least one exit aperture of the blowing arrangement with the surface member extending, in an extended configuration thereof, laterally across the vehicle body surface, and in which the surface member, at least in said extended configuration is forwardly concave. The surface member has been found to provide good performance with this shape and may also be styled to match adjacent or nearby features of the vehicle such as a rear decklid drop surface line.

A number of features which may be incorporated when implementing any one of more of the above disclosures will now be described.

The airflow blowing arrangement may be located at or in a vehicle body upper surface for reducing lift away from the vehicle body surface when the vehicle is in forward motion, the air blowing arrangement being behind or within a downwardly sloping area of upper vehicle body work.

The downwardly sloping area of vehicle body work may slope down at a slope angle which is at over 5 degrees to the horizontal. The slope angle may be from 5 to approximately 60 degrees, preferably from about 10 to 40 degrees, for example within 15 to 30 degrees, one example being substantially 20 degrees.

The airflow blowing arrangement may be located at or in a vehicle body surface for reducing lift away from the vehicle body surface when the vehicle is in forward motion, the blowing arrangement and vehicle body surface being arranged and configured to decrease lift and/or drag when a vehicle to which the apparatus is fitted is travelling forwards at a Reynolds number above $2 \times 10^6$ or above $3 \times 10^6$.

The airflow blowing arrangement may be located at or in a vehicle body surface for reducing lift away from the vehicle body surface when the vehicle is in forward motion, the blowing arrangement including a slot extending across the vehicle body surface, the slot having a length in the intended longitudinal direction of motion of the apparatus of between 2 and 10 mm.

The airflow blowing arrangement may be located at or in a vehicle body surface for reducing lift away from the vehicle body surface when the vehicle is in forward motion, the air blowing arrangement and vehicle body surface being configured such that at least one lateral position and at least one airflow speed for the apparatus the airflow blown out from the blowing arrangement towards free stream airflow is sufficient to move a pressure point at a rear of the vehicle body surface forwards relative to its position with the blowing arrangement blocked or inactive (a) forwards over 10 cm, typically over 25 cm, in some examples over 40 cms such as 40 to 50 cm forwards or (b) forwards over 5% of the wheel base length of a vehicle to which the apparatus is to be fitted, typically over 10% or 15%, such as between 15 and 20% forwards. The pressure point may be (although is not necessarily) a point at which pressure equals or is greater than free stream pressure.

The surface member may be arranged to extend generally away from the vehicle body surface and extend laterally thereacross in relation to intended free stream flow, the surface member being positionable with portions of its surface substantially perpendicular to adjacent portions of the vehicle body surface, the surface member being movable from a first position to a second position in which the surface member protrudes further from the vehicle body surface than it does in the first position. In the first position, the surface member may be flush or sub-flush with the vehicle body surface. The surface member may be arranged to act as a Gurney flap.

The surface member may be arranged to extend generally away from the vehicle body surface and extend laterally thereacross in relation to intended free stream flow, and a blowing arrangement in the vicinity of the surface member for blowing air into passing airflow. The blowing arrangement may be formed with an air exit aperture within the surface member. The exit aperture may comprise at least one slot. The surface member may be arranged to operate as a Gurney flap.

The features of the above disclosures have been found in testing to provide improved vehicle response and stability across vehicle road speed range during straight line and cornering manoeuvres.

The airflow blowing arrangement may include an exit aperture adapted to blow flow out into free stream or at least nearby passing flow and to create an obstruction to flow travelling over the vehicle body surface and to create a high pressure region upstream of an exit from the blowing arrangement. The blowing arrangement may comprise a duct leading to at least one outlet aperture or exit. The blowing arrangement may be arranged to jet flow in a direction substantially perpendicular to flow passing the vehicle body surface. However, the jet flow direction may be in other embodiments in any other direction but especially in the longitudinal and vertical plane of the vehicle to which the apparatus is fitted. The blowing arrangement may be arranged to provide the jet flow such that substantially all of the flow from an exit of the blowing arrangement is ejected from the exit in substantially the same overall direction.

The blowing arrangement may comprise an array of blowing elements extending substantially laterally across the vehicle body surface. The array may include at least one elongate slot. The array may comprise a plurality of said slots such as 2, 3, or 4 said slots, which are substantially aligned and are arranged one next to the other across the vehicle body surface, such as comprising aligned left, centre and right slots. Each slot may have a width laterally which is substantially longer than its length longitudinally in the intended direction of motion of the apparatus. The vehicle body surface is preferably an A-surface. In some embodiments one or more perforated panels areas with a series of small perforations may be used in addition to or as an alternative to one or more slots, if desired.

The vehicle body surface preferably comprises an upper body surface. The vehicle body surface may include a roof portion and/or a rear window portion of an occupant space for a vehicle, the roof portion and/or rear window portion lying in front of the blowing arrangement. The vehicle body surface may comprise or include a boot lid or decklid such as a rear boot lid or decklid. When the vehicle body surface includes a boot lid or decklid portion, the blowing arrangement may be formed at least partly or fully in the said boot lid or decklid portion. The boot lid or decklid portion may be arranged to cover a rear enclosure of a vehicle, such as an enclosure for luggage and/or vehicle motor/engine components.

When the blowing arrangement includes at least one blowing slot, each slot may have a length in the longitudinal direction of flow of between about 2 to 15 mm or 2 to 8 mm, some examples being about 3 and about 5 mm, or about 8 mm or about 10 mm.

The vehicle body surface may be connected to a rear drop down surface located below a rear edge of the vehicle body surface. The drop down surface may be overhung, thereby extending downwardly and forwardly from the rear edge of the vehicle body surface. The blowing arrangement may have a rearmost portion which is located about 0.5 to 100 mm from the rear edge of the vehicle body surface, more typically within about 3 to 50 mm some examples being about 35 mm and about 10 mm, such as about 7 mm or 5 mm from the rear edge.

The drop down surface and vehicle body surface may be oriented (in at least one vertical section in a longitudinal plane) substantially perpendicular to one another, the rear edge of the vehicle body surface (which is the edge between them) having a radius which is less than 10 cm, preferably less than 5 cm, about 1, about 2 or about 3 cm being some examples.

The blowing arrangement may include a duct leading to an exit aperture thereof, the duct preferably curving gradually towards the aperture. The duct may have a duct supply portion running directly towards or within about 20 degrees of directly towards the exit aperture, the duct supply portion having a flow length which is over 5 times the length (in the flow direction inside the duct) of the exit aperture/slot length (in the free stream flow direction) of the blowing apparatus, the flow length of the duct portion for example being 5 to 10 times or about 10 to 15 times this length. This has been found advantageously to increase the performance of the blowing arrangement.

In some preferred embodiments, the blowing arrangement and/or vehicle body surface and a vehicle structure in front of the blowing arrangement may be configured such that with at least one speed flow near the vehicle body surface is substantially attached and/or lacking in substantial vortices or turbulence. The blowing arrangements thus blow out into such flow.

In some embodiments, the blowing arrangement may include a Gurney or surface member arranged to extend generally away from the vehicle body surface and extending laterally across the vehicle body surface, the surface member preferably having a front part positioned upstream of a flow exit aperture or exit slot of the blowing arrangement. The surface member may, at least when located in an extended configuration may extend from a location in the vehicle body surface which is fully in front of the exit aperture or slot of the blowing arrangement.

The said aperture or slot of the blowing arrangement may be positioned within the surface member. However, the surface member may be a separate element, such as being arranged to extend out from the vehicle body surface from a location ahead of the said aperture or slot.

The surface member may be positionable with portions of its surface substantially perpendicular to adjacent portions of the vehicle body surface. The surface member may be retractable within and/or below the vehicle body surface. A control may be provided for extending and/or retracting the surface member. The surface member may be retractable in response to a signal indicative of stationary vehicle, engine off or travelling at low speed. The surface member may be extendable out from the vehicle body surface in response to a signal indicative of vehicle motion or travelling at high speed or in response to a driver input such as a push button. A cover member may be provided for moving over and covering the surface member and/or the blowing arrangement when the surface member is retracted. The cover member may be arranged to move to a position in which it is substantially aligned with the vehicle body surface such that with a vehicle to which the apparatus is fitted stationary there is no or is substantially no prominence within the region of the airflow control apparatus and a high level of design aesthetics or a design objective for little or no prominence may be achieved.

The said aperture or slot of the blowing arrangement may be formed in a moveable vehicle body surface section. The vehicle body surface section may comprise a surface extending across the width of the vehicle.

The moveable vehicle body surface section may be substantially perpendicular to the surface member.

The moveable vehicle body surface section may be positionable with portions of its surface substantially aligned with adjacent portions of the vehicle body surface. The vehicle body surface section may be raised above the adjacent vehicle body surface. The surface member, which may comprise part of the vehicle body surface section, may then face upstream of the vehicle.

The blowing arrangement may comprise at least two exit apertures or laterally extending slots. Each sot may be fluidly connected to a separate respective air inlet, for example, provided on a respective side of the vehicle. Therefore, even when the vehicle is subjected to cross wind or cornering, flow may be provided to each exit aperture or slot.

A heating arrangement may be provided for the blowing arrangement. Thus, ice, snow or other precipitation may be prevented from blocking the blowing arrangement and adversely affecting performance.

The blowing arrangement may include an air inlet for supplying the airflow to an exit portion of the flow control apparatus at the vehicle body surface. The air inlet may comprise at least one aperture located in the region of a rear quarter light window of a vehicle. The air inlet may otherwise comprise another type of simple A-surface intake, such as a side pod, scoop or discontinuous shut line arrangement. Alternatively, the air inlet may comprise an under floor scoop underneath a vehicle such as a car to which the air flow control apparatus is to be fitted, or a powered air feed inlet such as involving a compressor, turbine or another form of electromechanical or mechanical system.

The blowing arrangement may be configured to decrease lift and/or drag when a vehicle to which it is fitted is operating at a Reynolds number above $2\times10^6$ or above $3\times10^6$ for example, above $10\times10^6$, $12\times10^6$ or $15\times10^6$ being other examples, between $2\times10^6$ and $35\times10^6$ being considered achievable, between $3\times10^6$ and $30\times10^6$ being quite typical and some examples of successful application being operation at $3.39\times10^6$, $16.9\times10^6$ and $25.44\times10^6$. In the calculation of Reynolds number in this specification, the characteristic length is the longitudinal length of the vehicle.

A further aspect of this disclosure comprises a vehicle including a vehicle airflow control apparatus as set out in any one of the preceding aspects of this disclosure. The vehicle may comprise a land vehicle. The land vehicle may comprise a motor car. The motor car may be capable of operation in excess of 200 kph or even in excess of 250 or 300 kph, operation at up to or over about 450 to 500 kph being envisaged in some motor car arrangements. The vehicle may, for example, comprise a fastback, GT, saloon, estate, hatchback, SUV or convertible.

The present invention has been found through testing to enable the provision of a motor car capable of operating at high speeds and at relatively high Reynolds numbers with good vehicle response and stability across the full speed range during straight line and cornering manoeuvres. Measurements have showed an increase in surface pressure on the vehicle body surface (when it is decklid) up stream of the blowing arrangement of approximately 900 Pa. This translates into a very significant reduction in aerodynamic lift at the rear of the vehicle and can also be associated with a reduction of drag, thus improving efficiency while providing good high speed handling.

The blowing arrangement may emit air into passing air flow with a speed higher than free stream air speed. In other cases, the blowing arrangement may emit air into passing air flow with a speed substantially the same as free stream air speed or less.

BRIEF DESCRIPTION OF THE FIGURES

The present invention may be carried out in various ways and various explanatory disclosures embodiments of preferred vehicle airflow control apparatus is in accordance with the invention will now be described by way of example with reference to the accompanying drawings in which.

DETAILED DESCRIPTION

Figure 1:
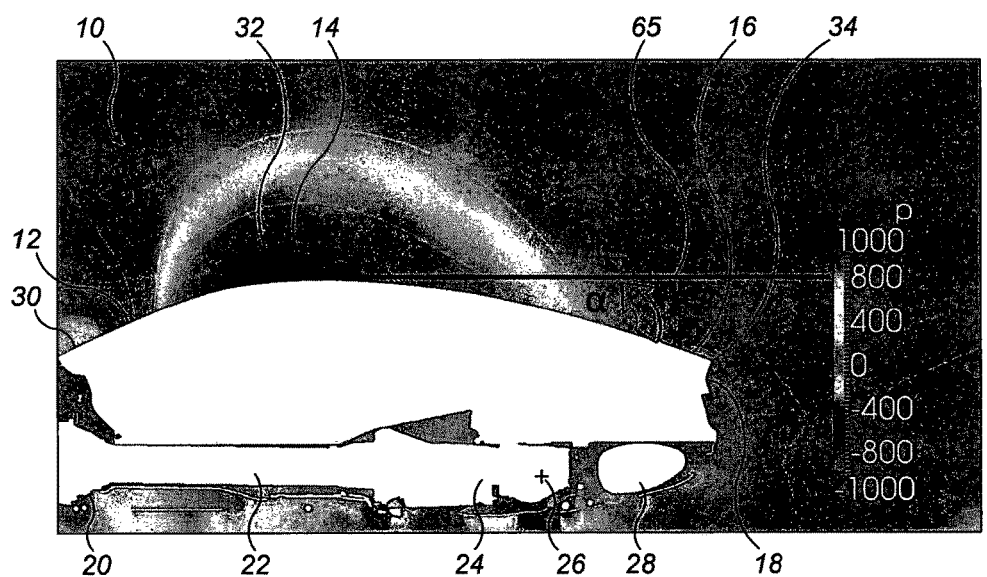
FIG. 1 is a view of pressure distribution on a vehicle body without a blowing arrangement active.

FIG. 1 shows a 44.44 m/s CFD simulation taken along a central vertical plane of a motor car having a front wind screen 12, roof 14 and boot or decklid 16 and a rear drop down surface 18. The figure also shows a powertrain component 20, torque tube 22, transaxle/differential 24 with rear wheel axis generally at point 26, as well as fuel tank 28.

FIG. 1 shows that there is a positive downward pressure compared to free stream of about 400 Pa at a lower part 30 of the front windscreen 12, a negative (lift) pressure of about 400 to 600 Pa at upper point 32 of the roof 14 and lift pressure all of the way along from the upper point 32 to rear edge 35 which is between the boot lid 16 and rear drop down surface 18, the pressure at the edge 35 being a negative (lift) pressure of about 300 to 400 Pa.

Figure 2:
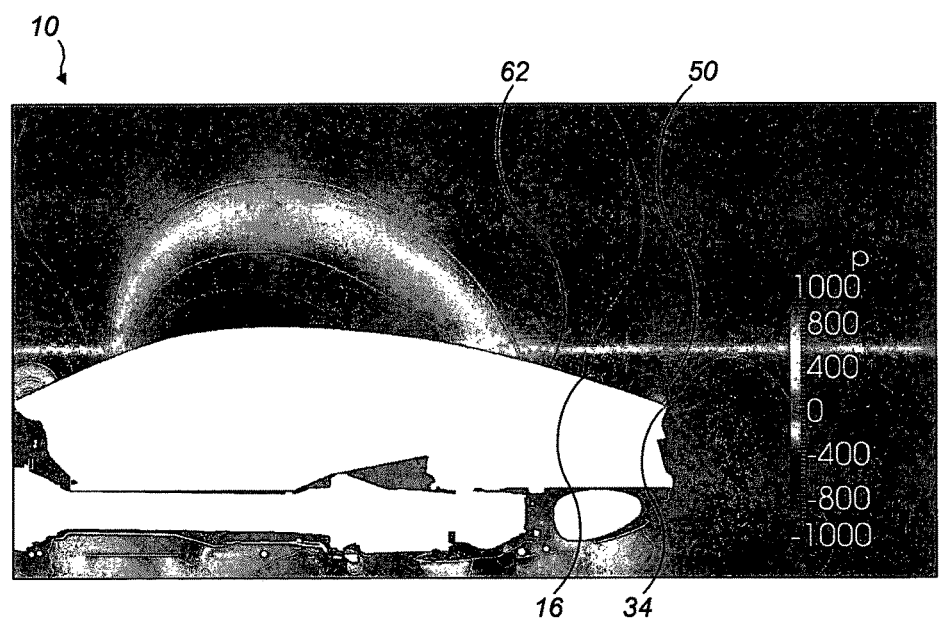
FIG. 2 is a similar pressure distribution example but with a blowing arrangement active.

FIG. 2 is a similar view in which the motor car 10 has been modified to include a blowing slot 34 as shown in FIGS. 2 to 12.

Figure 6:
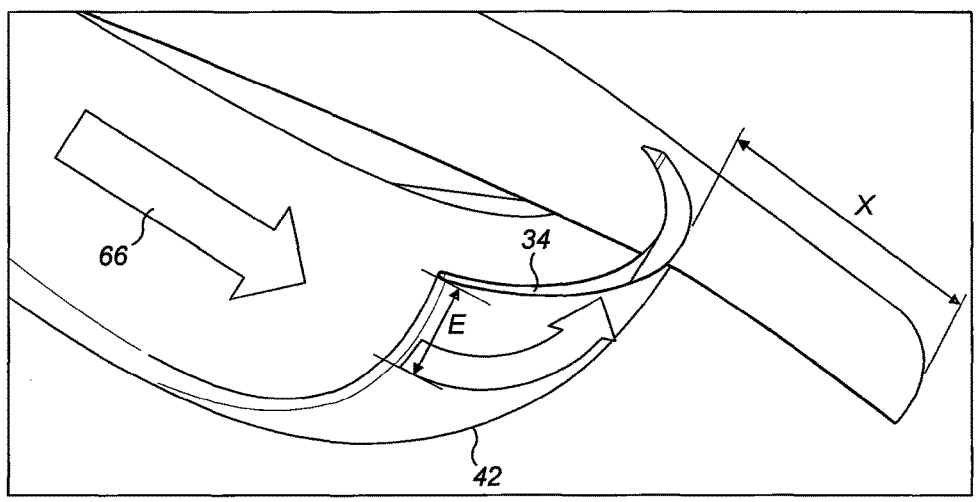
FIG. 6 schematically shows a blowing duct as it approaches the airflow exit at a slot from the flow blowing arrangement of FIG. 4.

The blowing slot 34 is fed from an inlet 36 which in this example is an A-surface inlet 36 located at a rear corner 38 of rear quarter light area 40 of the car 10. The inlet 36 is connected to the blowing slot 34 by a duct 42 part of which is shown in FIG. 6. When the vehicle is in forward motion, as shown in FIG. 4, a stream 44 of air passively (i.e. without the use of compressor etc.,) enters into the inlet 38 and is fed by the duct 42 to the slot 34 where the stream 44 emerges as a jet 46 which as shown in FIGS. 3 and 4 extends across the full width of the blowing slot 34 and is directed substantially vertically into the passing airflow 48, although the angle of the jet 46 may be varied, for example so as to be perpendicular to the adjacent body surface 16/boot lid surface 16.

As shown in FIG. 2, which shows flow at the same speed (44.44 m/s) and Reynolds number (about $8.5 \times 10^6$) as that in FIG. 1, the blowing slot 34 results in a high pressure area 50 in front of the blowing slot 34 where the pressure is up to about 500 or 600 Pa above free stream air pressure and the pressure in this area is therefore up to about 900 Pa higher than the same place in FIG. 1. The place 62 at which the pressure returns to positive or at least zero (gauge pressure compared to free stream) on the boot lid 16 is approximately 40 to 50 cm in front of rear edge 34—and this is with a motor car having a wheelbase of about 2.8 metres. Therefore, negative lifting pressure is no longer present for this relatively long distance at the rear of the motor car 10.

Accordingly even with the large back light angle (alpha) between the horizontal/free stream airflow direction and the adjacent angle of the boot lid 16 (which is marked 65 in FIG. 1 as well as "alpha" and is substantially 20 degrees), and despite the curved roof profile at the point 32, the blowing slot 34 enables the motor car 10 to be engineered which does not involve significant lift near the rear of the vehicle which will be taken up mainly by the rear wheels on the axis 26. The blowing slot 34 thus has reduced the negative pressure on the upper surface of the motor car 10 and therefore lift. In place of the negative pressure on the boot 16, there is now a high pressure region (at about 400 to 500 Pa or so above free stream) for at least approximately 10 cm or more in front of the blowing slot 34 which creates down force. The blowing slot 34 creates an obstruction for the flow travelling over the surface of the boot 16 creating a high pressure region up stream of the exit 34 from the duct 42. The blowing slot therefore jets fast moving air into the flow vertically and/or substantially perpendicular to the adjacent A-surface, creating the aerodynamic effect of a flip, but without changing the back light angle and without having to have a flip or spoiler.

Figure 3:
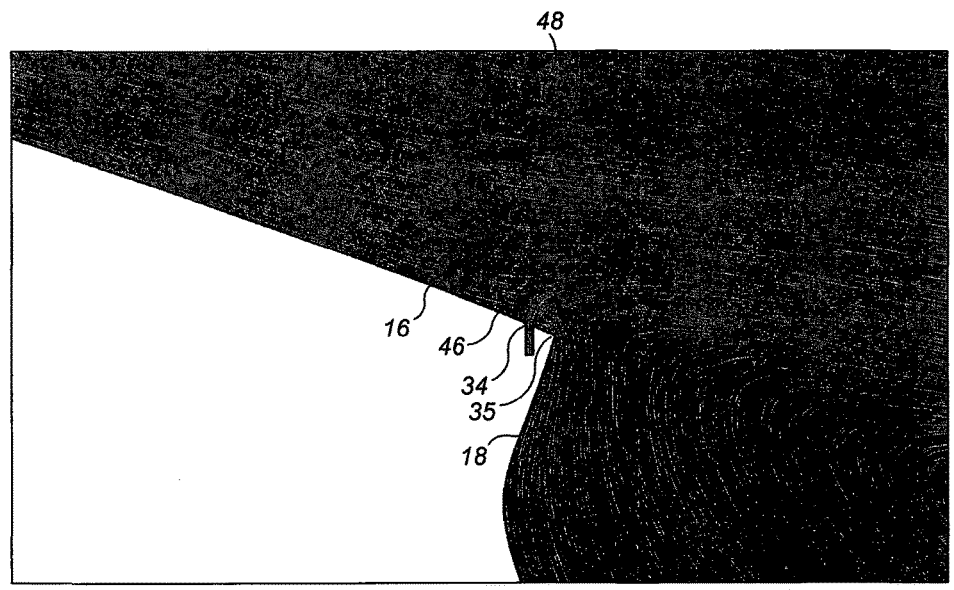
FIG. 3 shows a CFD depiction of the flow caused by the blowing arrangement of FIG. 2, with air jetted out from the A-surface to create an obstacle for the passing air over the boot/decklid surface.
Figure 4:
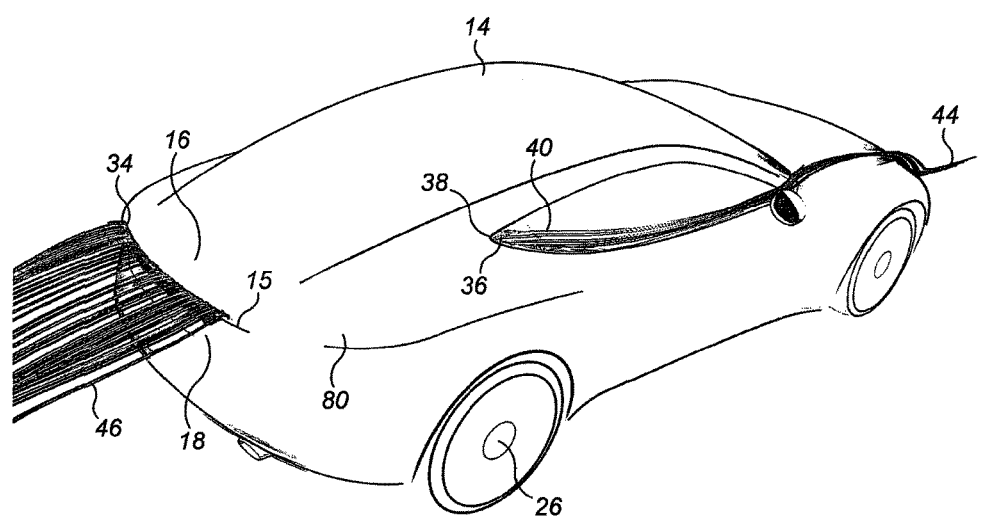
FIG. 4 shows a preferred embodiment of a vehicle as in FIGS. 2 and 3 and including a blowing arrangement.

FIG. 3 shows a close up of the effect of the air 46 coming out from the blowing slot 34 into the free stream or adjacent airstream. The fast air coming out from the duct forces air to slow down and travel over the top of the jet 46 of air.

The exit geometry at the blowing slot has a significant effect on efficiency and a blowing slot width in the direction of flow of both 3 mm with a 2 mm radius on the edges and larger 5 mm slot have been tested, with the 5 mm width slot surprisingly performing better than the initially calculated best size of 3 mm. The larger 5 mm slot increases the mass flow of the duct and ultimately the effect that the blowing slot 34 has on lift and drag reduction. Thus, in FIG. 5, the distance D, which is the longitudinal size of the slot along the airflow direction, is substantially 5 mm.

A slot larger than 5 mm could be provided in other embodiments but may not be acceptable from an aesthetic point of view in all cases. As shown in FIG. 6, the duct 42 which is a generally hollow element is in the region of the blowing slot 34 angled up towards the blowing slot 34. For a distance E, which is approximately 75 mm, the direction of flow in the duct 42 is substantially directly towards the slot 34 and is within about 10 or 20 degrees or so from being directly towards the slot 34. The inventors have found that the sooner the duct 42 curves upwards to face the surface of the boot lid 16 normal from its original path, i.e. the path 66 from the inlet 36 which is shown in FIG. 6, the more powerful the blowing slot 34 is, i.e. the longer the air had pointed up at the underside of the boot or decklid 16, the better the performance of the blowing slot 34.

Figure 5:
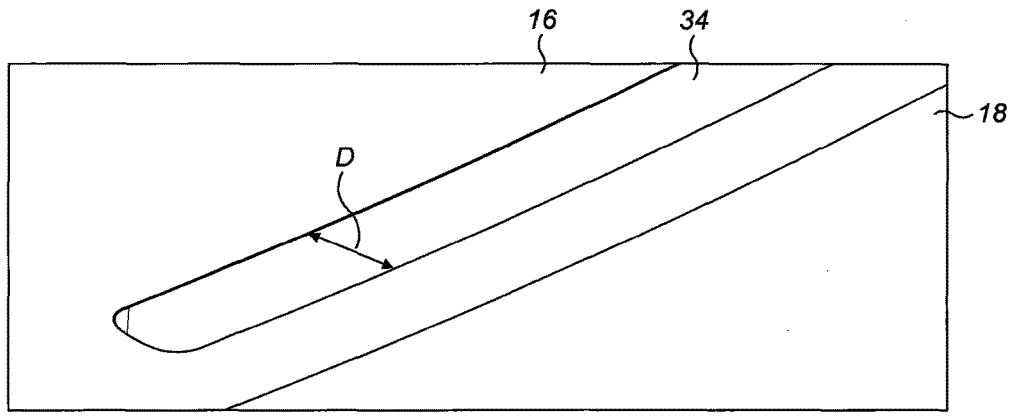
FIG. 5 is a view showing part of a blowing slot of the blowing apparatus of FIG. 4.

The distance X shown in FIG. 6 of the blowing slot 34 to the rear or trailing edge 35 of the decklid surface 16 is important and the lesser this distance the more powerful and effective the blowing slot 34 is in many embodiments. The distance X is substantially exaggerated in FIG. 6 since as can be seen in FIGS. 3, 4 and 5, the trailing edge of the blowing slot is approximately 5 to 10 mm from the edge 34. As shown in FIG. 3, the edge 35 between the boot lid surface 16 and the overhung drop down surface 18 has a relatively small radius which is in some embodiments about or less than 20 mm. Directly after the blowing slot 34 is a low pressure region of separated flow which can in some embodiments generate a concentrated lift force and to minimise this effect, the blowing slot 34 is normally positioned as close to the trailing edge 35 of the decklid 16 as possible.

It is notable that the entire upper surface of the motor car at the central section of FIG. 2 from the windscreen 12 and over the roof top 14 and past the decklid 16 to the rear edge 35 is non-concave—all of the way along, it is convex or substantially flat. For about a first quarter of horizontal distance back from the leading lower edge of windscreen 12 to rear edge 35, this central section is substantially flat or slightly convex, for about a middle two quarters the section is convex and for about a last quarter the section is slightly concave or substantially flat and sloped down at about 15 to 25 degrees more specifically at about 20 degrees to horizontal.

The width of the blowing slot 34 across the motor car 10 provides linear performance sensitivity, i.e. as the slot increases in width (assuming an increasing mass flow to maintain exit velocity), the lift linearly reduces with the drag. In the real world, where the mass flow stays relatively constant, the lift and drag continue to decrease with increasing slot width to a point where the exit velocity becomes very low (approximately equal to or less than 0.2 times the velocity of the free stream flow).

Figure 7:
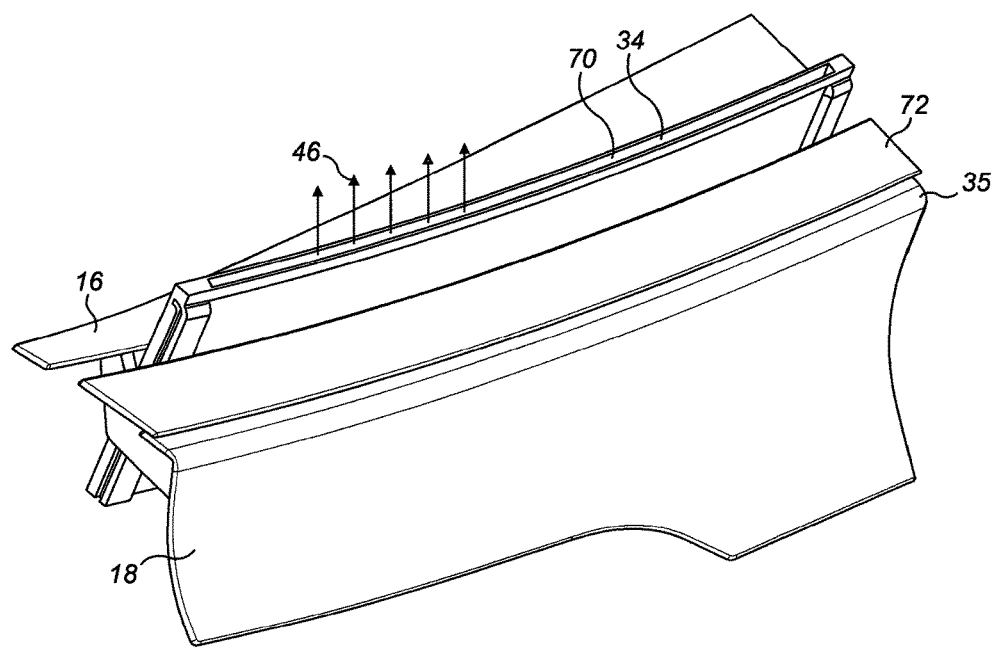
FIG. 7 shows a modified airflow control apparatus having a surface extending generally away from a vehicle body surface, the surface member being in an extended position thereof.
Figure 8:
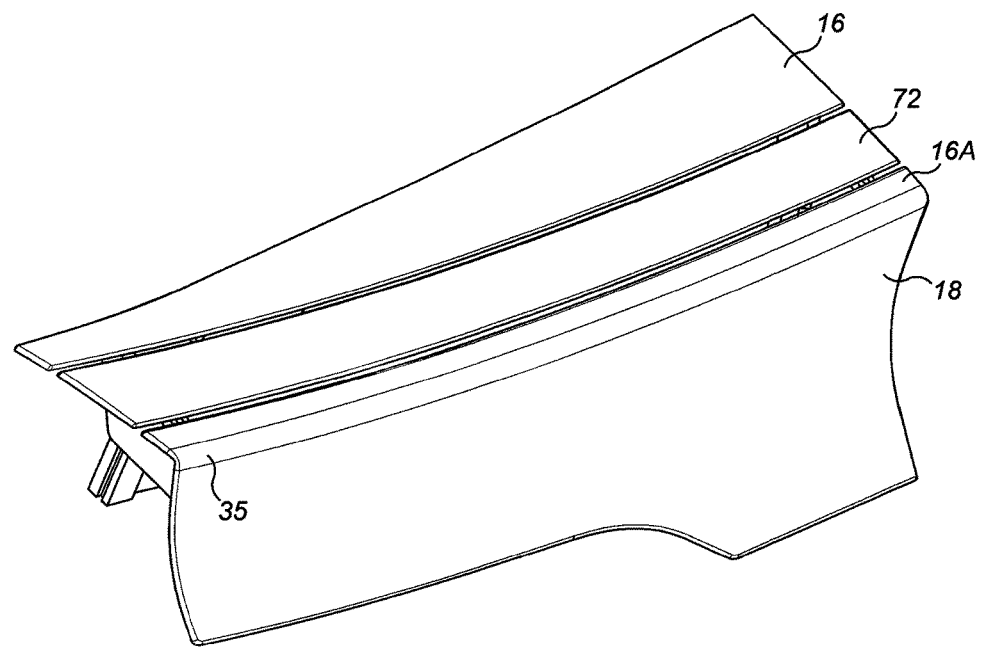
FIG. 8 shows the apparatus of FIG. 7 with the surface member retracted and covered by a cover.

As shown in FIG. 7, a surface member 70 or "Gurney"-type member may be positioned upstream of the blowing slot 34 exit and it has been found that this may cause more flow to be drawn through the duct 42. As shown in FIG. 8, the blowing slot 34 may be sealed when it is not needed, i.e. while the motor car 10 is stationary, has the engine off or is travelling at low speed. Instead of the orientation in FIG. 7, in which the surface member 70 is deployed and extends from the A-surface/boot lid 16 of the motor car 10 with the cover panel 72 moved out of the way in the X (longitudinal) and Z(vertical) directions, as shown in FIGS. 8, the Gurney member or surface member 70 is retracted below the height of the boot lid surface 16 and the cover member 72 is slid along and moved down such that its upper surface is aligned with the upper surface of the boot lid 16 and a rear most panel element 16A just in front of the edge 35 which leads down to the rear drop surface 18. As can be seen in FIG. 7, the blowing slot 34 is essentially a gap in the middle of the surface member 70 where the blowing slot air is released as the jet 46, part of which is shown in FIG. 7. The configuration shown in FIG. 8, with the cover panel 72 folded back into A-surface of the motor car 10, the Gurney member or surface member 70 is hidden. This advantageously allows the arrangement to meet a design objective for clean lines which may be set in some circumstances yet still provide a good aerodynamic system.

A mechanism or other movement means (not shown) is provided for moving the member 70 and other arrangements may be used in other embodiments to seal the duct when the vehicle is stationary and/or deployed.

To form the inlet 36, the side glass of the rear quarter light 40 has been rolled inboard to reveal an opening comprising the inlet 36.

The inlet 36 in other embodiments may be replaced while still providing the same type or similar blowing slot 34 in which the air is controlled/forced to react with the free stream upon leaving the duct 42. Other possible intake method includes simple A-surface intakes, such as side pod, scoop, discontinuous shut lines etc., and under floor scoop, similar to that shown in FIG. 4 but underneath the motor car end/not on an A-surface, or a powered air feed, such as involving a compressor, turbine or other electro-mechanical system.

The blowing arrangements of the embodiments described herein have a working range where the effects of the device are measurable from 40 to 200 mph, although this range can be extended to well above 200 mph because the effects of the blowing slot increase with vehicle speed and this has been shown both with CFD and on test drives. It is considered therefore that the blowing arrangements described in the present application can be used on motor cars at the speeds up to equal to or in excess of 260 or 300 mph for road vehicle applications. In aerospace applications, higher speeds are envisaged.

With the Reynolds number as calculated by multiplying the wheel base length of the vehicle which is 2.803 meters by the density of air at 15° C. which is 1.225 kg per cubic meter and multiplying by the velocity of the free stream air in meters per second, and then dividing by the viscosity of the air at 15° C. which is $1.81 \times 10^{-5}$ kg per meter per second, the arrangements in the present application operate at 40 miles per hour at a Reynolds number of $3.39 \times 10^6$ at 200 miles per hour of $16.96 \times 10^6$ and at 300 miles per hour of $25.44 \times 10^6$.

CFD analysis so far has shown that the blowing arrangement designs in the present application have the following performance capabilities on a vehicle as shown in FIGS. 2, 3 and 4, although the values will change dependent upon the application of the blowing slot and the specific vehicle geometry. With an arrangement as shown and described with reference to FIGS. 2 to 6, the drag reduction as $C_d$ is 10 and rear axle lift reduction is $C_L r$ is 35. For the arrangement shown in FIGS. 7 and 8 the drag reduction $C_d$ is 4 and rear axle lift reduction $C_L r$ is 50. These are very useful reductions in drag and lift suitable for improved economy, stability and road handling.

Physical tests have been performed using first an unmodified vehicle 10 similar to that shown with reference to FIG. 1, second with the vehicle 10 modified to have a blowing arrangement as described with reference to FIGS. 2 to 6 and third with the vehicle 10 modified to have an arrangement similar to that in FIGS. 7 and 8 with a deployed surface member or Gurney member 70 as shown in FIG. 7.

The motor vehicle was instrumented to provide data along with drive evaluation and measurements included surface pressures, vehicle ride height, suspension displacement, lateral accelerations and vehicle speed. A series of tests were carried out and the test procedures explored vehicle response and stability across the full vehicle road speed range during straight line and cornering manoeuvres. The tests also evaluated various failure modes, operation with one or both side windows open, in yaw and with one side inlet 36 blocked.

The test measurements showed an increase in surface pressure on the decklid upstream of the blowing slot 34 of approximately 900 Pa translating to a significant reduction in aerodynamic lift acting at the rear of the vehicle.

The professional test driver noted the following information and it must be noted here that the unmodified vehicle 10 compared to average road vehicles is already exceptionally fast with highly superior and safe vehicle handling, so the results are comparative only.

Unmodified Motor Car

Compared to the modified vehicle 10, vehicle stability at 200 kph and 250 kph sine sweep manoeuvre had a smaller under steer limit. The car 10 slid from the rear.

Motor Car Modified as in FIGS. 2 to 6

The vehicle stability was improved during 200 kph and 250 kph sine sweep manoeuvring. There was some understeer at the limit and the car slid from the rear. The rear lift appeared to be reduced, giving the rear tyres more capability at the limit.

Motor Car Modified with Burn Slot as Shown in FIG. 7

Vehicle stability was improved at 200 kph and 250 kph sine sweep. There was understeer at the limit. The car slid from the rear when provoked. The rear lift appeared to be significantly reduced giving the rear tyres more capacity and capability at the limit.

Failure modes have been considered and can be dealt with by failure controller outputs as follows. Failure modes of ice packing, detected with pressure measuring equipment, can be handled by a failure controller output consisting of a transmission of a heating signal to a heater means (not shown) for the duct 42, a driver warning signal and/or speed limiter signal. Failure of the Gurney or surface member 70 failing to deploy be handled by a failure controller output comprising a driver warning and/or a speed limiter signal. A failure of the Gurney or surface member 70 failing to stow can be handled with a driver warning. A failure mode of one or more windows at the side of the vehicle being lowered can be handled by no action being necessary. A failure mode of a duct 42 leaking can be handled by a failure controller output consisting of a driver warning.

Figure 10:
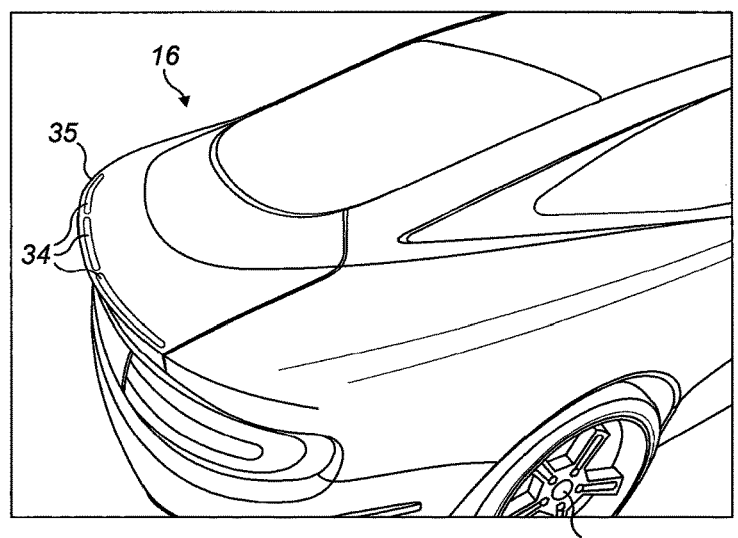
FIG. 10 shows an arrangement similar to that shown in FIG. 4 but including three separate but aligned slots in a boot or decklid instead of one long one.

FIG. 10 shows a modification in which the blowing slot 30 of FIG. 4 is replaced by three blowing slots 34 which are placed in line across the boot lid 16.

In other embodiments, the blowing slot may instead of a length of 5 mm in the flow direction of freestream flow have a length from 2 mm to 8 mm. The width of the blowing slot across the motor car may be chosen for the application and in some embodiments 30 cm in length over a rear haunch panel 80 may be used and in others a width of around 1.5 meters across the span of the rear of the motor car can be used. The simulations in FIGS. 1 and 2 are run at 44.4 meters per second. At this speed, the air exiting the duct was 50 meters per second. The exit angle from the duct can also be varied and the range of plus to minus 60° relative to normal to the surface of the boot lid 16 has a desirable effect. The larger the velocity exit, the steeper the angle that can be used. The main operating window is between 45° aiming upstream from normal to 30° downstream from normal.

Figure 11:
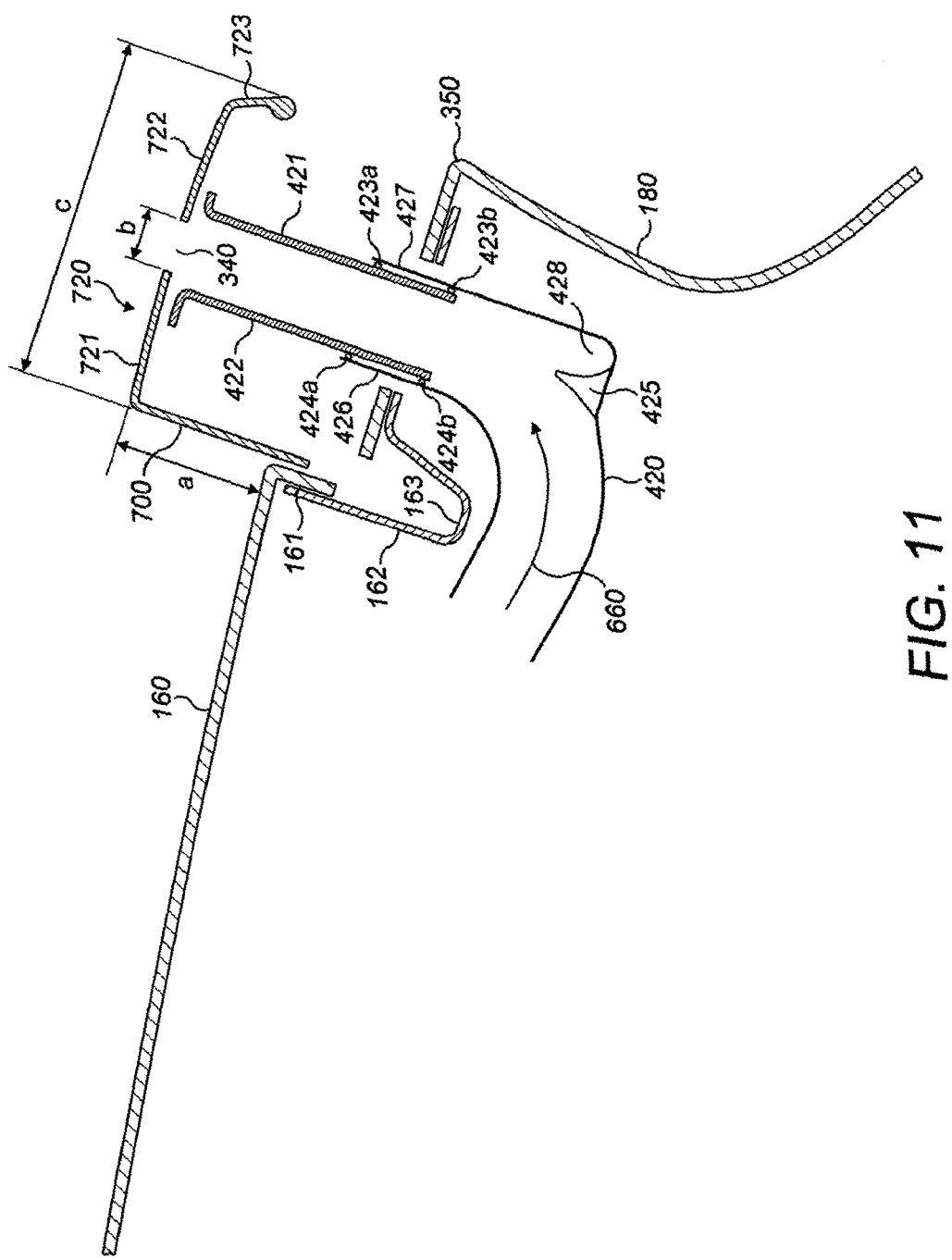
FIG. 11 shows a cross-section of a modified airflow control apparatus comprising a deployable spoiler with a blowing slot provided in an upper surface thereof.

FIG. 11 shows a cross-section of a modified airflow control apparatus comprising a moveable vehicle body surface section shown generally at 720 with a blowing slot 340 provided in an upper surface thereof. Here, not cover is provided. This arrangement is a variation of the arrangement shown in FIG. 7.

In FIG. 11, a surface member 700 or "Gurney"-type member may be positioned upstream of the blowing slot 340 exit. In contrast to FIG. 7, the surface member 700 joins an upper surface 721, 722 of the body surface section 720. In the embodiment, the surface member 700 is generally perpendicular to the upper surface 721, 722 of the body surface section 720.

The upper surface 721, 721 of the body surface section 720 and surface member 700 may be retracted such that the surface 721, 722 of the body surface section, or at least portions thereof, is in substantial alignment with an adjacent upper surface 160 of the body of the vehicle. The body surface section 720 and surface member 700 can be deployed, for example above a predetermined vehicle speed or air mass flow measurement, by extending the gurney or surface member 700 from the A-surface/boot lid 160 of the motor car. The body surface section 720 and surface member 700 can be raised above the adjacent vehicle body surface. The surface member 700, which may comprise part of the vehicle body surface section 720, may then face upstream of the vehicle to act as a Gurney-type flap.

When in the deployed, raised state, the surface member 700 is located against an inner surface edge 161 which extends below the upper surface 160 of the vehicle. The inner surface edge 161 joins a swan-neck like profile surface 162 which forms a channel 163 in which the surface member 700 can be received when in a retracted state.

The blowing slot 340 comprises front and rear surfaces 422, 421, which extend into duct 420, which duct is fluidly coupled to an inlet such as the inlet 36 shown in FIG. 2.

When the body surface section 720 is deployed and retracted, the front and rear surfaces 422, 421 of the blowing slot 430 increasingly or decreasing overlap with corresponding surfaces 426, 427 of the duct 420. Between the corresponding surfaces 426, 427 of the duct 420, sealing elements 424a, b and 423a, b are provided, to provide a seal between the surfaces and prevent leakage of air in duct 420 into the interior surfaces of the body surface section 720.

When in a retracted position, the rear surface 722 of the body surface section 720 extends over the trailing edge 350 of the decklid, overlapping, with an obtusely profiled lip 723, partially over the rear drop down surface 180.

Air flow in the duct is represented by arrow 660. An air-guide 425 may be provided in the duct 420 to prevent stagnation of air in a square recess 428 in the duct formed to receive the rear surface 421 of the blowing slot 340 when the body surface section 720 is retracted.

A drain (not shown) may be provided in the duct 660 to drain liquid which may collect in the duct 420.

The longitudinal depth b of the blowing slot 340, in the embodiment, is of the order of 13.5 mm. A depth of 2 to 10 mm is also contemplated. When extended, the surface member 700 has a height a of around 40 mm. The overall depth of the body surface section is around 55 mm. The blowing slot 340 is located preferably as near to the edge of the surface member 700 as possible. The surface member is positioned as near as possible to the drop line 180 of the vehicle. The radius between the surface member 700 and the front body surface section surface 721 is made as sharp as possible, although is a minimum of 2.5 mm to comply with legal requirements. The exact dimensions can be chosen to provide suitable aerodynamic performance.

The effect of the blowing slot and surface member 700 is generally the same as described in relation to the embodiment of FIGS. 7 and 8. The leading face provided by the surface member 700 serves to create a high pressure region that acts on the vehicle's boot and a low pressure bubble behind itself which can help suck more air out from the air inlet in the side of the vehicle.

The deployable body surface section 720 provides a smooth vehicle body profile when retracted. Similarly to the embodiment of FIG. 7, the deployable surface member provides an additional means of down force should, for example, the blowing slot become blocked, for example, by snow. The duct may be provided with filters or grates of the like to prevent the ingress of air-borne objects in the duct. Warm air, for example, from cooling of the engine, may also be directed through the duct to prevent freezing of mechanisms.

When the body surface section 720 is retracted, the arrangement can meet design objective for clean lines which may be set in some circumstances yet still provide a good aerodynamic system.

Figure 12:
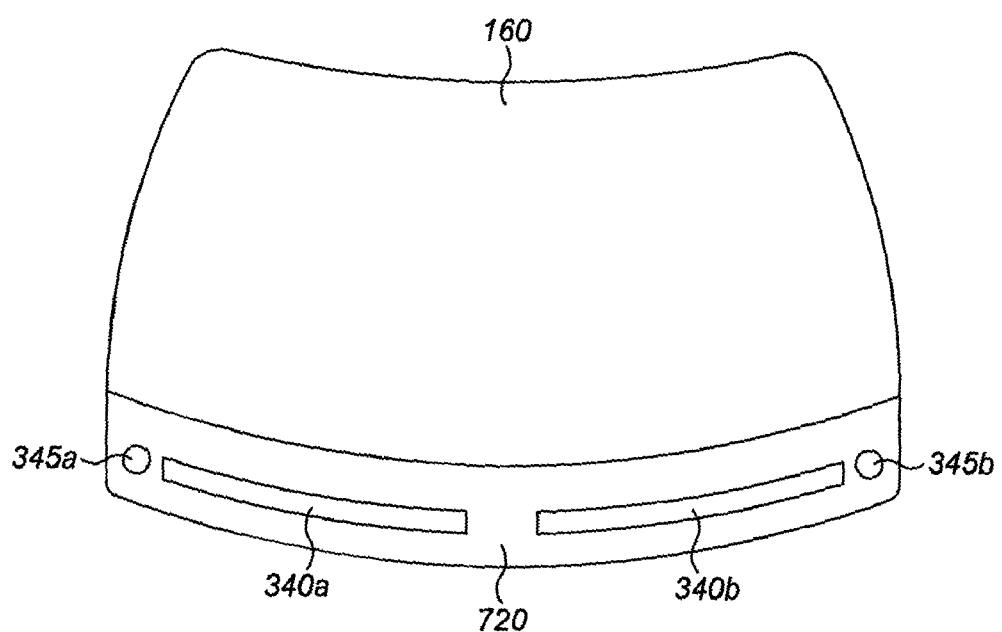
FIG. 12 shows a plan view of the airflow apparatus of FIG. 11.

FIG. 12 shows a plan view of the arrangement shown in FIG. 11. The body surface section 720 is shown retracted.

The blowing slot comprises two blowing slot sections 345a, 345b, each of which extends approximately half way across the lateral width of the body surface section. Each blowing slot 345a, 345b is fed with air from a respective inlet on each side of the vehicle, for example, the inlet 36 shown in FIG. 2.

A mechanism or other movement means (not shown) is provided for moving the body surface section 720 and surface member 700. Actuators 345a, 345b may be provided at either side of the body surface section 720. These actuators can include, but are not limited to, hydraulic, pneumatic or other mechanical means.

Figure 13:
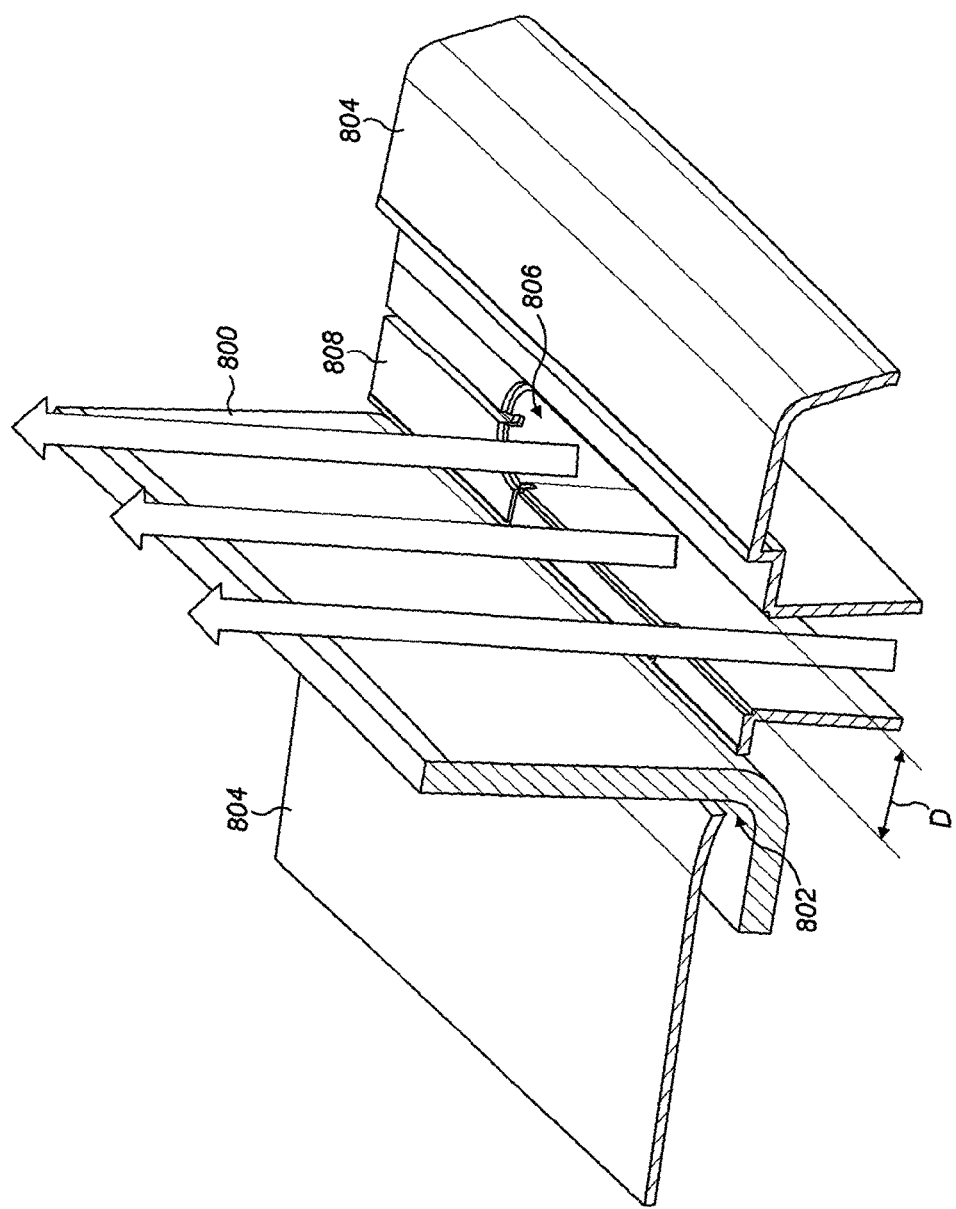
FIG. 13 shows a revised preferred embodiment in accordance with the present invention in which the surface member is located extending from a position in the vehicle body surface in front of the blowing slots.
Figure 14:
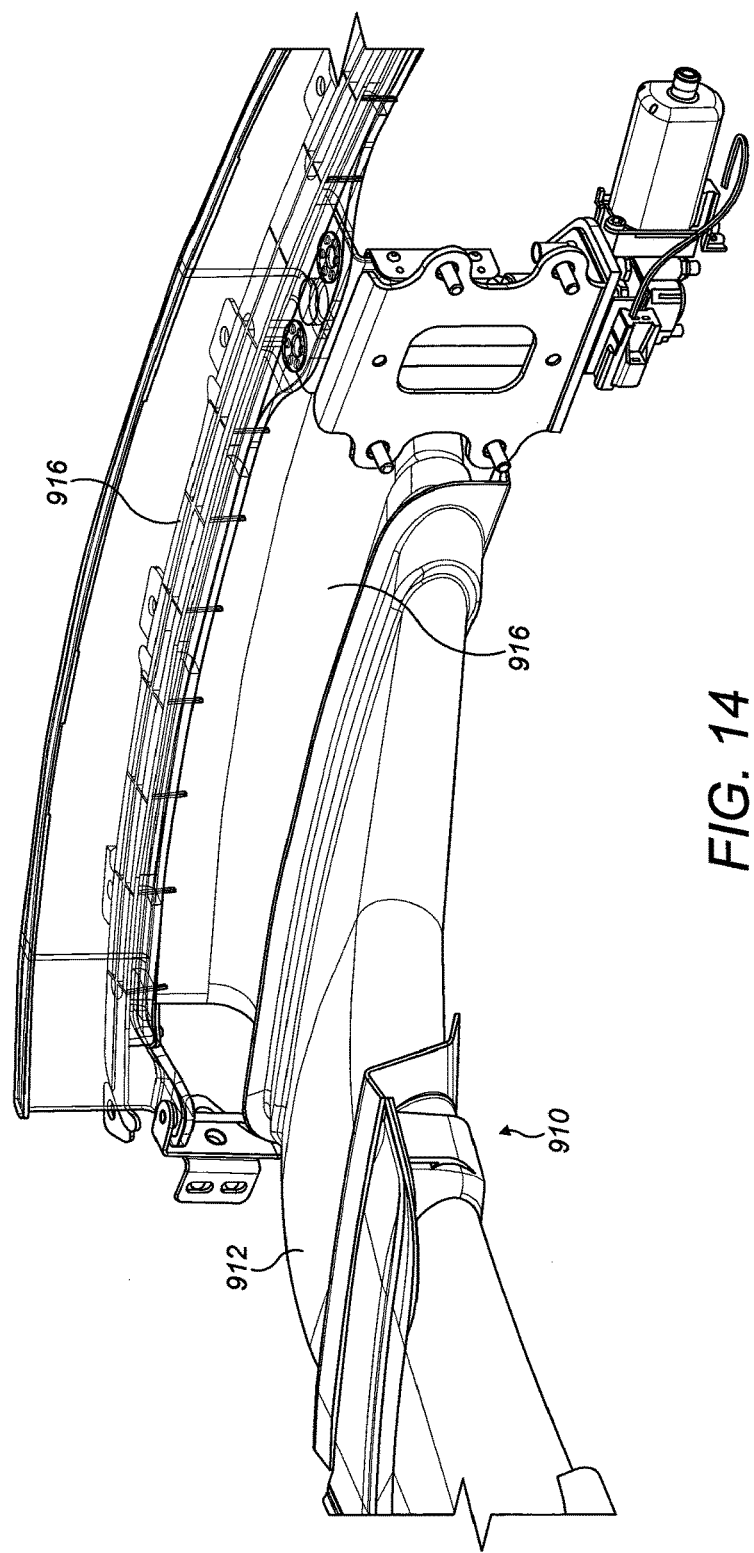
FIG. 14 shows part of a rear right hand side of a further revised embodiment in accordance with the present invention, viewed from in front and to the left.

FIG. 13 shows a modification in which linearly extendable and retractable flap 800 extends from a deployment slot 802 located in vehicle body surface 804 (rear decklid A surface) which is located fully in front of blowing slot exit 806. Blowing slot exit 806 is located in a channel 808 which is slightly sub-flush relative to vehicle body surface. The width of the blowing slot exit "D" in the free stream flow direction is about 8 mm. With the flap 800 extended substantially perpendicular to the adjacent portion of the vehicle body surface 804, the flap 800 extends about 45 mm away from the surface 804.

Figure 9A:
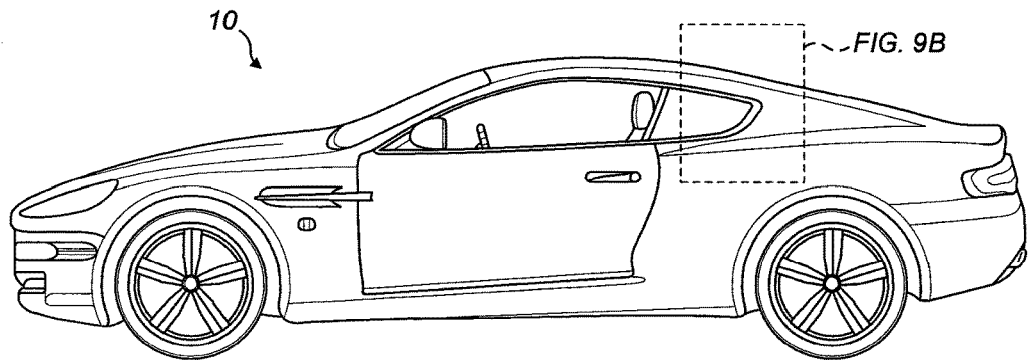
FIGS. 9A and 9B show an A-surface air inlet for use with the devices of FIGS. 1 to 8.
Figure 9B:
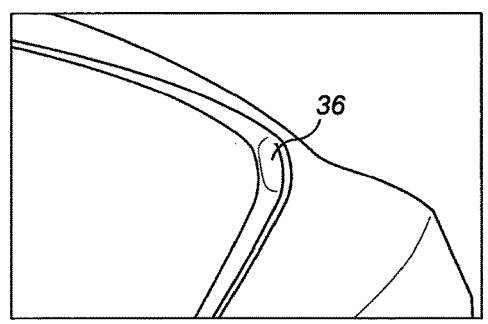
Figure 15:
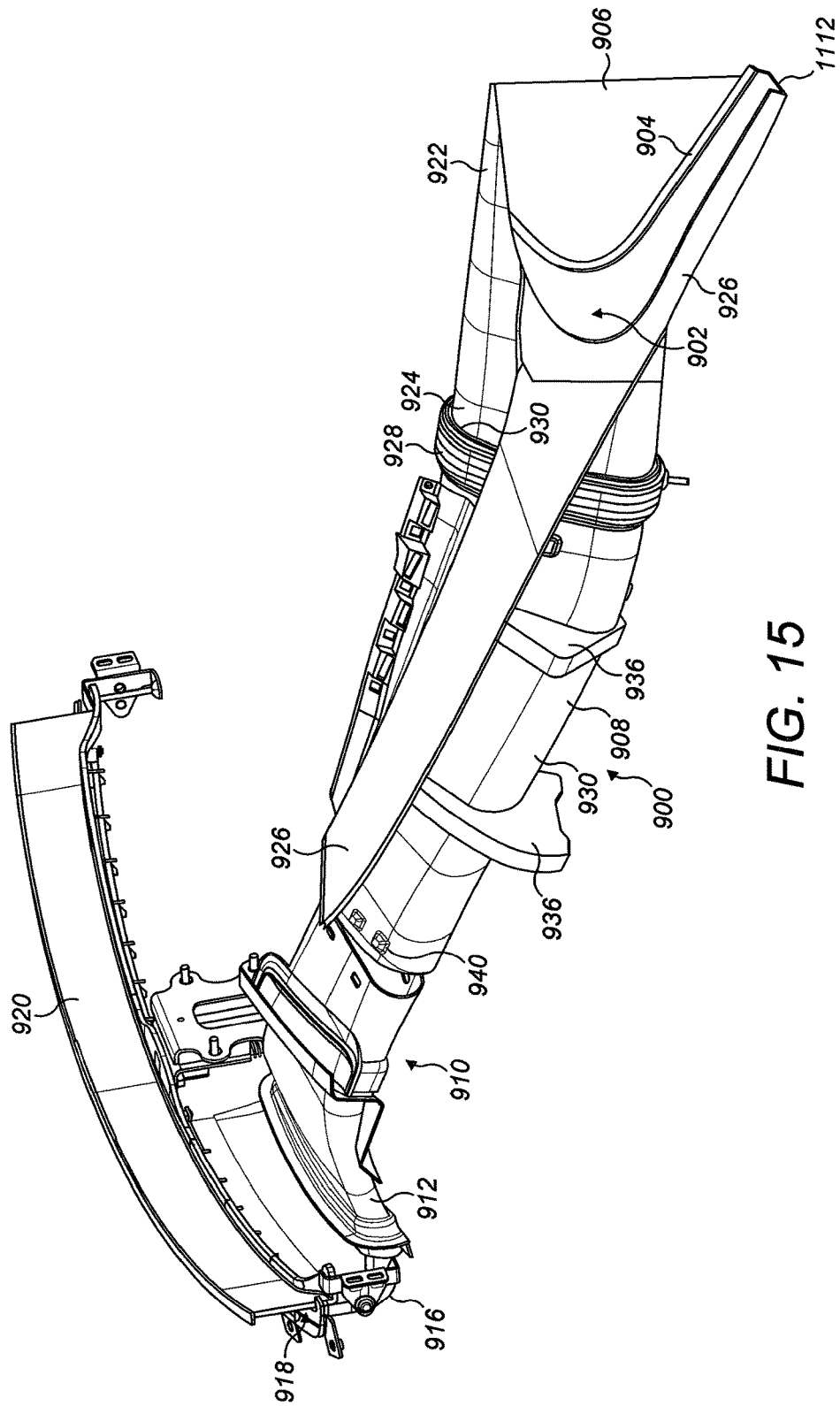
FIG. 15 shows the right hand side of part of the embodiment of FIG. 14, viewed from in front and to the right.
Figure 16:
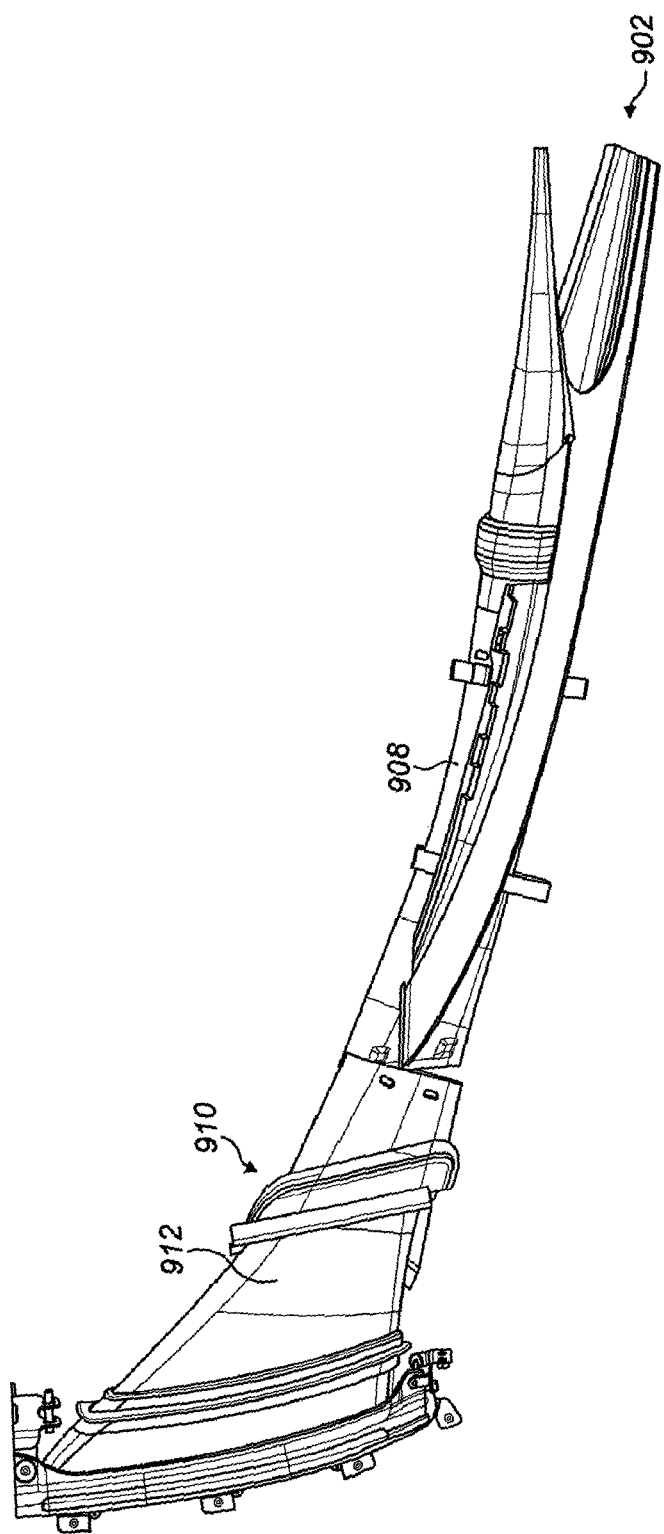
FIG. 16 shows parts similar to those shown in FIG. 15 but in plan view from above.

With reference to FIG. 15, in a revised preferred embodiment, the air inlets 36 of FIG. 9B are replaced on each side of the vehicle. In particular, FIG. 15 shows a blowing arrangement 900 having an air inlet 902 in the form of an inlet throat having an inner seal 904 which engages against the right rear quarter glass 906 of the vehicle, the throat leading to ducting 908 which leads via openable joint 910 then rear ducting 912 secured to rear decklid 914, the ducting finally leading past substantially 90-degree (or greater) bend 916 to exit blowing aperture 918. The left side of the vehicle (motor car) has a blowing arrangement which is a mirror image of that shown in FIG. 15.

As can be seen, a single extendable/retractable surface member of Gurney element 920 is provided which is adapted to extend configured forwardly concave across above the decklid in front of the two exit blowing apertures 918.

The seal 904 provides a smooth transition for air passing over the rear quarter glass 906 into the duct intake 902. The seal 904 may be profiled or chamfered to achieve this.

The intake 902 collects the air to be passed through the ducting 900. The intake 902 is defined by three components, namely a rubber upper trough 922, an injection moulded cap 924 and an injection moulded bodyside finisher part 926, which is a unitary part extending from the intake 902 along rearwards over the ducting 900.

Figure 18:
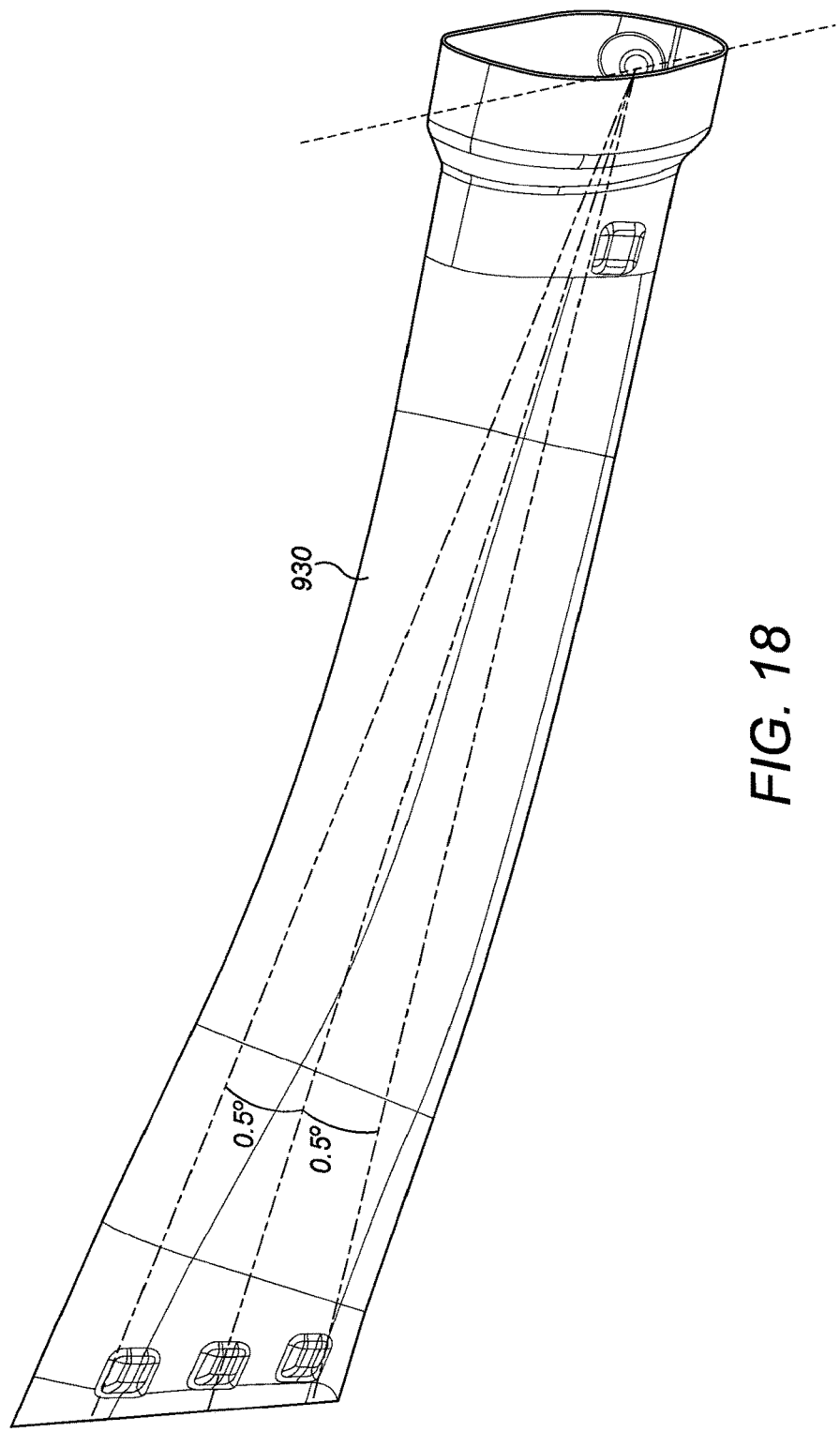
FIG. 18 schematically shows allowable flexing movement of ducting of the embodiment of FIG. 14 in the y direction (lateral)
Figure 19:
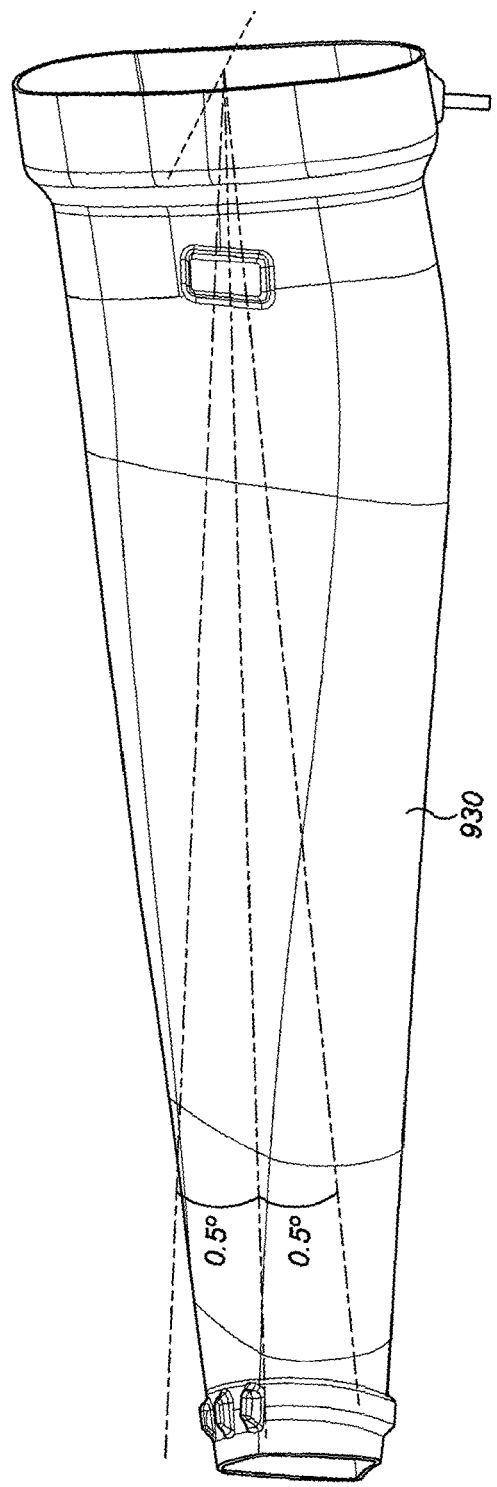
FIG. 19 is a view similar to FIG. 18 but showing allowable ducting movement in the z direction (up/down)

An intake seal 928 connects the intake 902 with main ducting 930 of the ducting 900. The seal 928 is in the form of a rubber concertina element and is a soft silicon seal which allows movement of the duct which is beneficial during installation and assembly, providing a good allowance for manufacturing tolerances. The rubber concertina element 928 provides a pivot action and together with a rubber bush 930 enables the duct to rotate in the Y direction and or Z direction as shown in FIGS. 18 and 19 so that, effectively, the ducting 900 is free to move within the body of the vehicle. The bodyside finisher element 926 is fixed in position relative to the vehicle body.

Figure 20A:
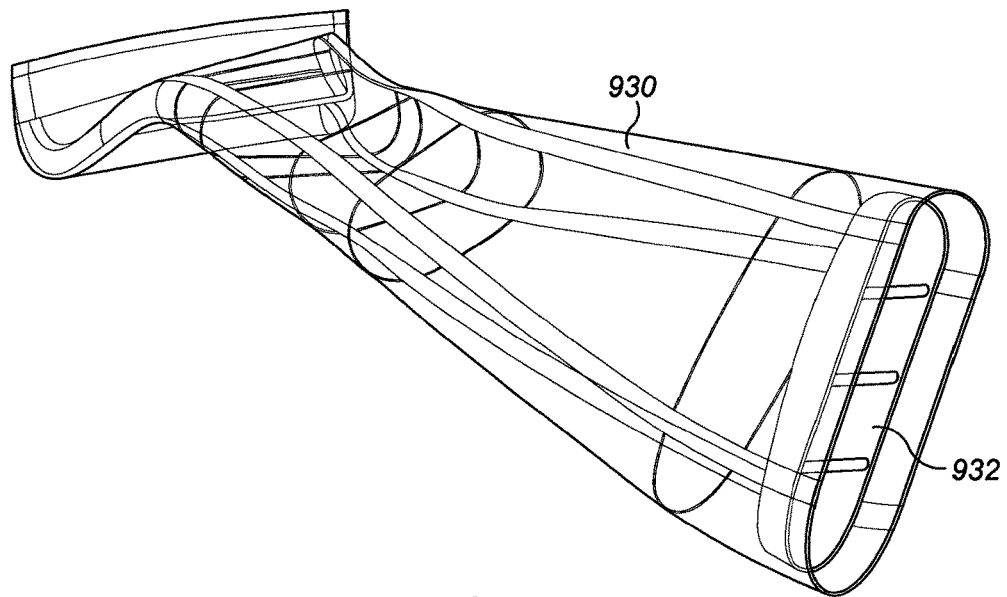
FIGS. 20A and 20B schematically show an inlet mesh for the embodiment of FIG. 14.
Figure 20B:
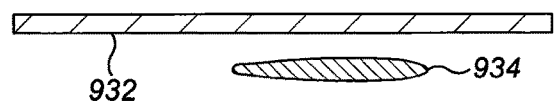
Figure 20B:
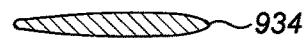
Figure 20B:
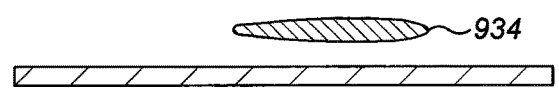
Figure 21A:
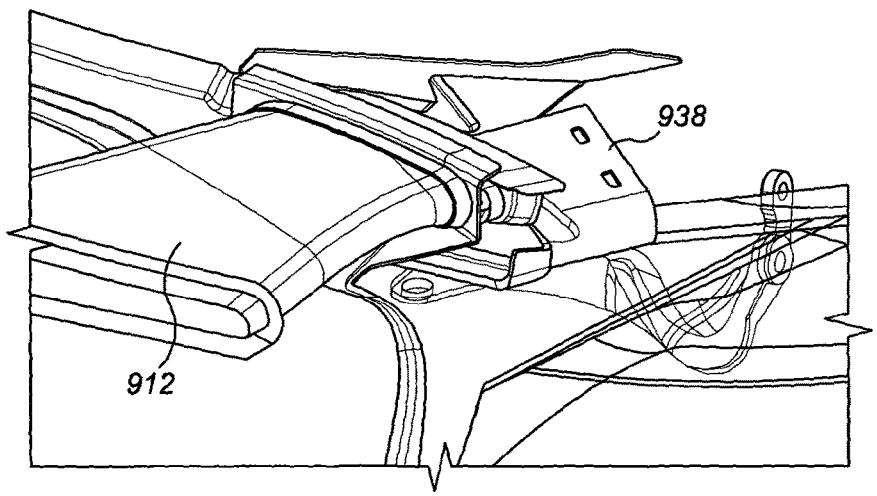
FIGS. 21A to 21D show components of an openable joint of the ducting used in the embodiment of FIG. 14.
Figure 21B:
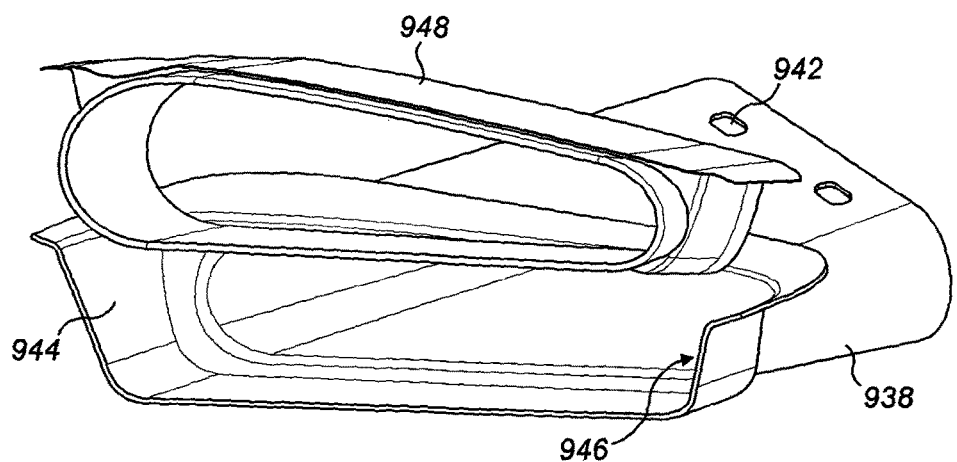
Figure 21C:
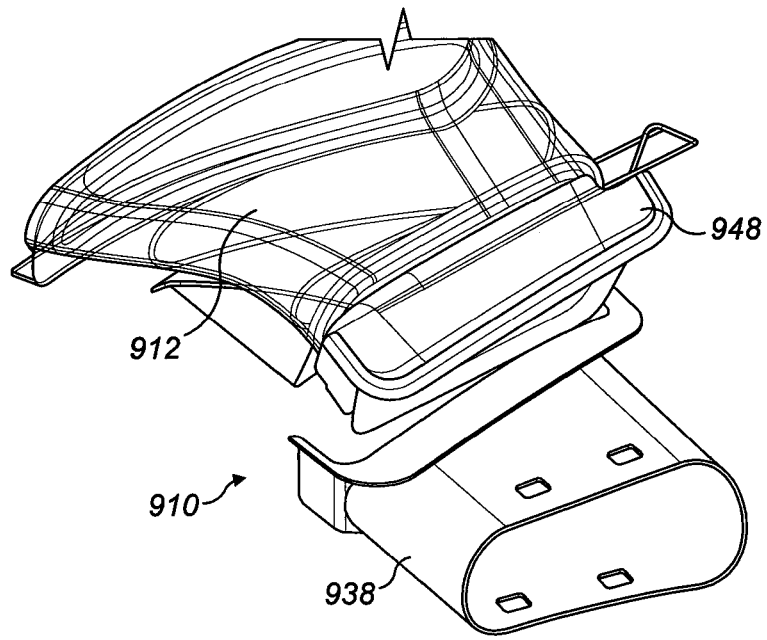
Figure 21D:
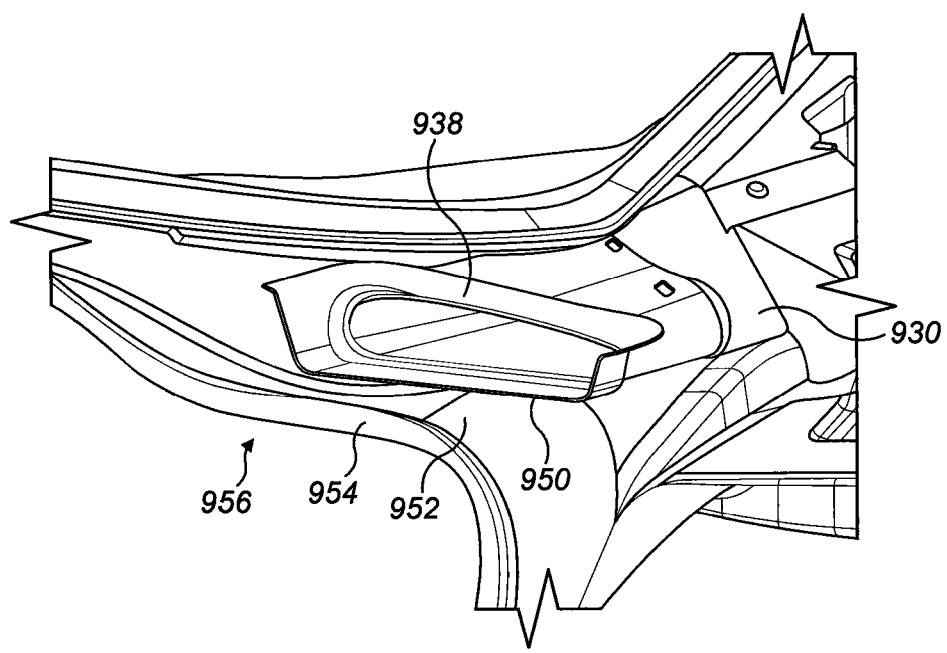

FIG. 20A and 20B show an inlet mesh 932 having NACA profile blades 934 which straighten flow and prevent foreign objects from entering the ducting 900. Each blade 934 has a specific NACA section to straighten flow with as little performance loss as possible, i.e. separation of flow from mesh blades 934.

As shown in FIG. 15, two foam donut rings 936 are provided extending around the main ducting 930. These donuts 936 hold the duct relatively still while it is in use, while the vehicle is moving, stopping unnecessary rattling.

A seen in FIGS. 21A to 21D, the openable joint 910 includes a lower self-alignment cup 938 which is arranged to connect the bodyside ducting 930 to the duct 912 sitting within the decklid. The cup 938 is injection moulded and is connected to the bodyside duct 930 by means of a sleeved connection, with clips 940 of the duct 930 slidable into clip apertures 942 of the cup 938. The cup 938 has angled or wedging inner sides 944, 946 which locate and move the duct 930 to align with the decklid-side duct 912.

The self-alignment cup 938 sits on a foam pressure pad (not shown) which applies pressure to ensure a good seal from bodyside duct 930 to decklid duct 912. The foam pressure pad exerts sealing pressure at all times when the decklid is closed.

A decklid duct interface seal 948 is mounted on the decklid duct 912 and connects as the openable joint with the cup 938. The interface seal 948 is made of rubber or rubber-like material, moves with the decklid and clamps down on the cup 938 when the decklid is closed. The interface seal 948 can have a plus or minus 5 mm x and y direction build tolerance and still form a seal, engaging between the faces 944, 946 of the cup 938. Interface seal 948 may include pads (not shown), e.g. of Nylon, on either side face thereof in order to increase service life.

The decklid duct 912 is bonded into the decklid 914, integrated into its B surface.

A rear edge 950 of the cup 938 is located above a trunk lid surround surface 952 in front of trunk seal 954. Therefore, rainwater dripping from cup 938 drips onto the trunk lid surround surface 952 rather than into the trunk 956. Also, a hinge axis 958 (FIG. 22) for the decklid 914 and decklid duct 912 plus interface seal 948 is located such that the interface seal 948 is located at all points of its movement range ahead of the trunk seal 954 such that rainwater does not drip out from the duct 912 or seal 948 into the vehicle trunk 956.

Figure 22:
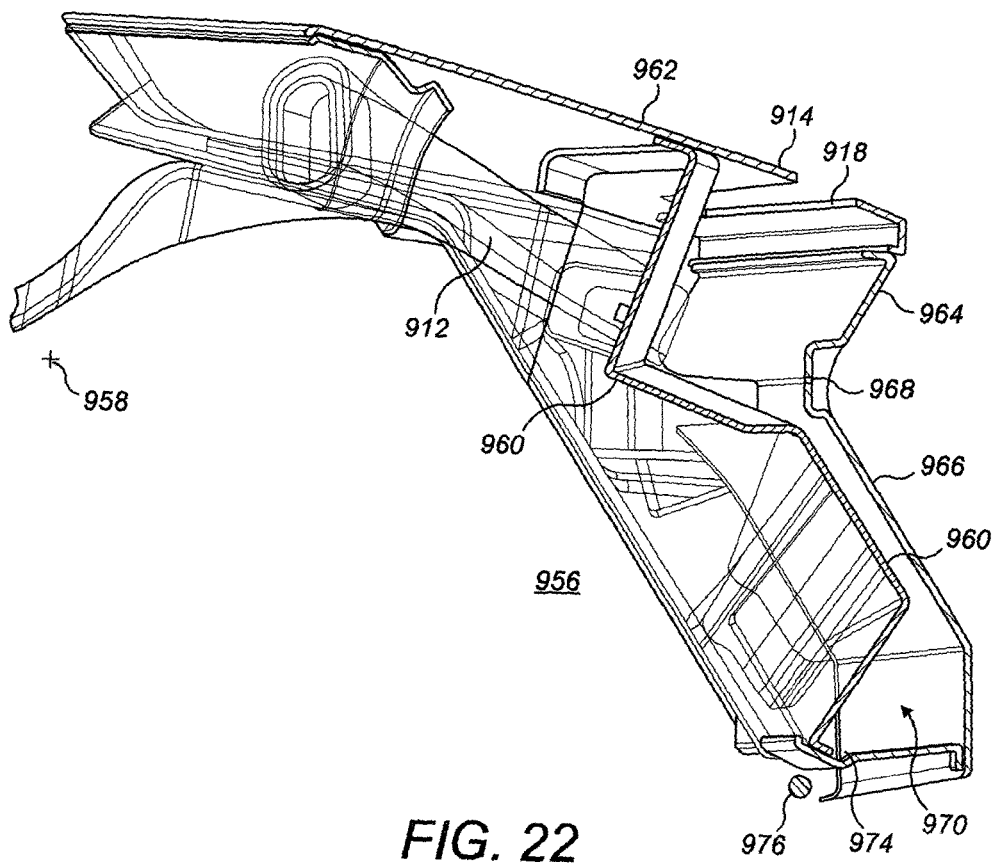
FIG. 22 shows a cross section through the decklid used in the embodiment of FIG. 14, including a water shedder plate, the view being in the y direction (lateral)

FIG. 22 shows in section water shedder plate 960 which eases water management, separating the system into "wet-"and"dry" sections.

The decklid 914 has a two-piece outer panel 962, formed of upper outer panel 964 and lower outer panel 966, joined at joint 968. These A-surface panels allow installation of ducting during assembly. The lower panel 968 can be the last part to be installed.

With reference again to FIG. 22, water can enter the "wet" section 970 of the system through the blowing slot 918 and through drain hole 970 (FIG. 23A) in ducting bend section 972 (FIG. 23A), draining down past lower edge 974 of water shedder plate 960 which is located behind lower trunk seal portion 976 (FIG. 22).

Figure 23A:
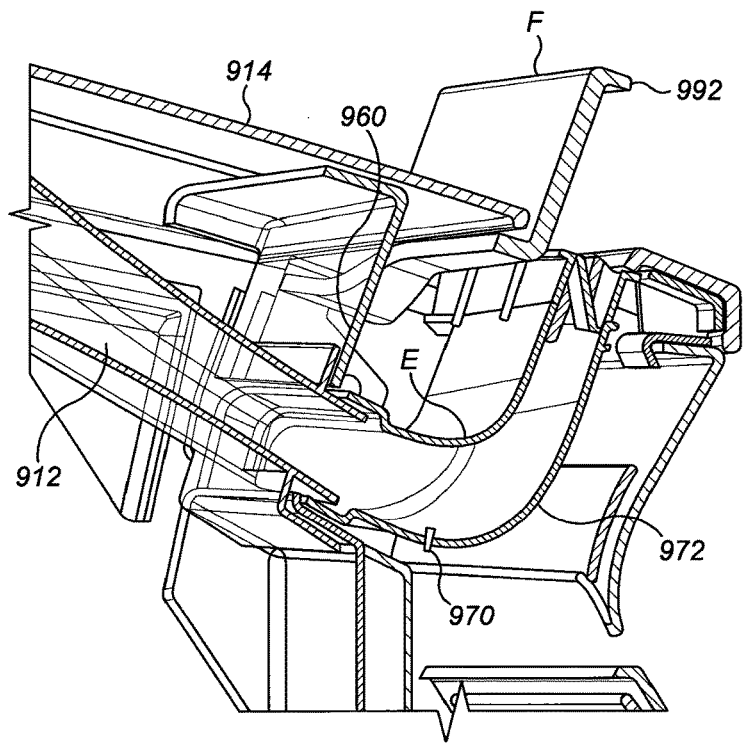
FIGS. 23A to 23D show various view of an extendable/retractable surface member (Gurney) of the embodiment of FIG. 14.

Referring to FIG. 23A, the ducting bend section 972, which joins to decklid duct 912 at water shedder plate 960 (sealed dry to wet condition), has a bend of substantially 90 degrees and is the final duct section, turning air flow before exit from the ducting. The ducting bend section 972 channels airflow coming rearwards in the vehicle up and outwards normal to the decklid upper surface 962 and has a minimum inner bend radius at point "E" of 20 mm approximately. The ducting bend section 972 is made from flexible material. This aids installation.

Figure 23B:
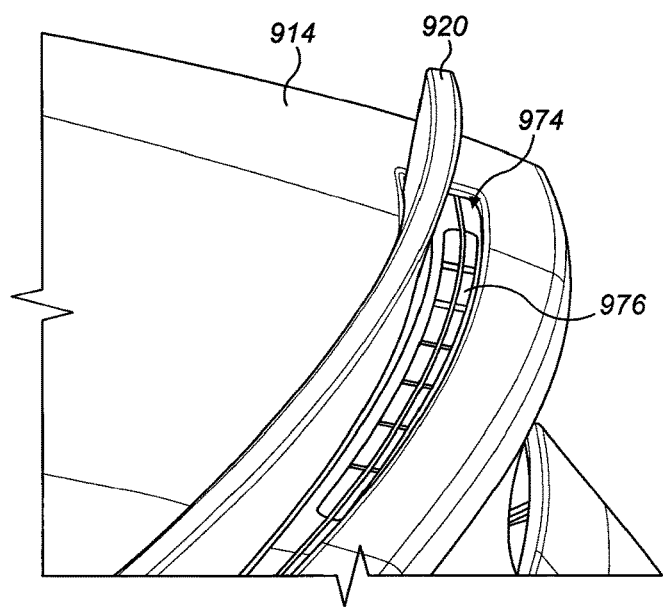

FIG. 23B shows an outlet grille 974 connected to the ducting bend section 972, the grille 974 having vanes 976 which are profiled for low drag and stop foreign objects from entering the duct system.

Figure 23C:
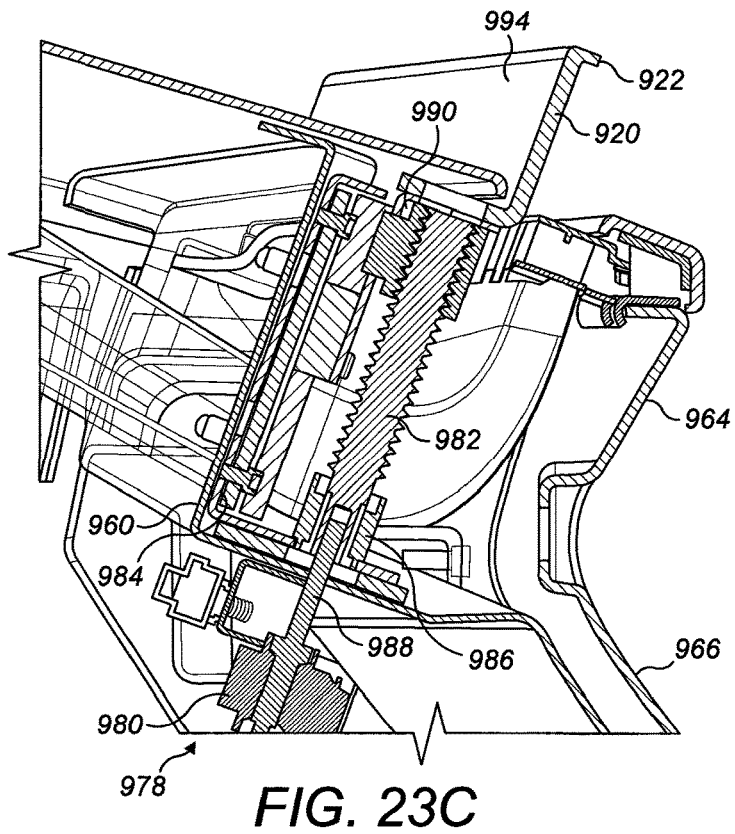

FIG. 23C shows a drive system 978 for moving the deployable spoiler or surface member 920. The drive system includes a motor 980 adapted to drive a lead screw 982 mounted by support 984 to water shedder plate 960 (which is bonded into decklid structure). The lead screw is part of a linear deployment mechanism for the spoiler 920. The motor 980 is dry-side-mounted. There is a water sealing interface 986 around mountings and motor drive shaft 988 extends through shedder plate 960. This controls cost and ensures long motor life. Limit switch system 990 is provided to control the mechanism to provide the required deployment stroke.

The motor 980 and lead screw 982 are on the centreline of the vehicle (motor car) so are the only actuator source for the spoiler 920. The spoiler, when deployed, creates a high static pressure region on the decklid A surface to reduce lift and draws more air through the duct system. The spoiler 920 is of Z section design. It has a 0.5 mm upper leading edge radius, at point F in FIG. 23A, in order to maximise aerodynamic performance. The Z section blade profile also enables the spoiler to fit around the ducting 972 when the spoiler is retracted. The Z profile also increases stiffness. The Z section profile also helps to improve aesthetic gap conditions, a rear trailing edge 992 slightly overlying the grille 974. Leading concave face 994 (FIG. 23C) of spoiler 920 is normal to decklid upper surface 914 in the region of the spoiler 920 when the spoiler is extended.

Figure 23D:
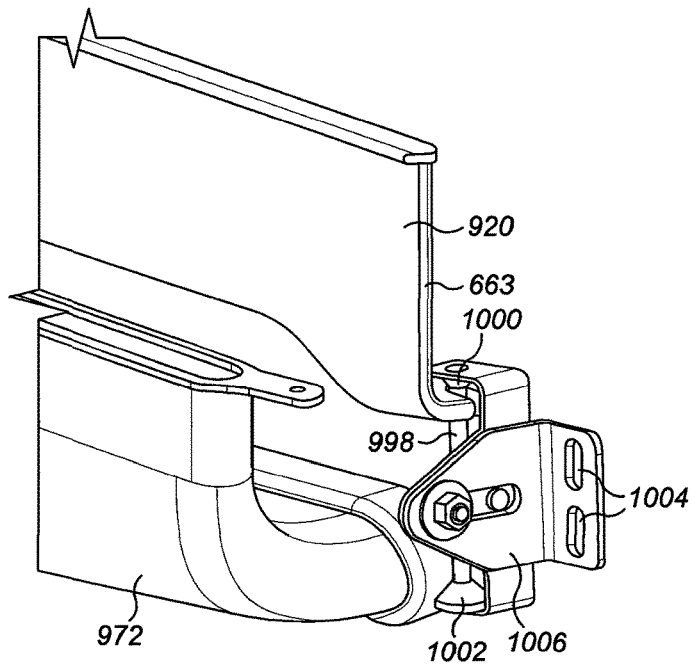

Outboard positional control of the spoiler 920 is provided as shown in FIG. 23D. At each side end 996 thereof, the spoiler 920 has an aperture which slidably engages a rod 998, the rod having upper and lower cone surfaces 1000, 1002. Using elongate slots 1004 to position support flange 1006 in the mounting thereof on to water shedder plate 960, the end positions of travel of the ends 996 of the spoiler can be tuned during vehicle assembly.

Figure 17:
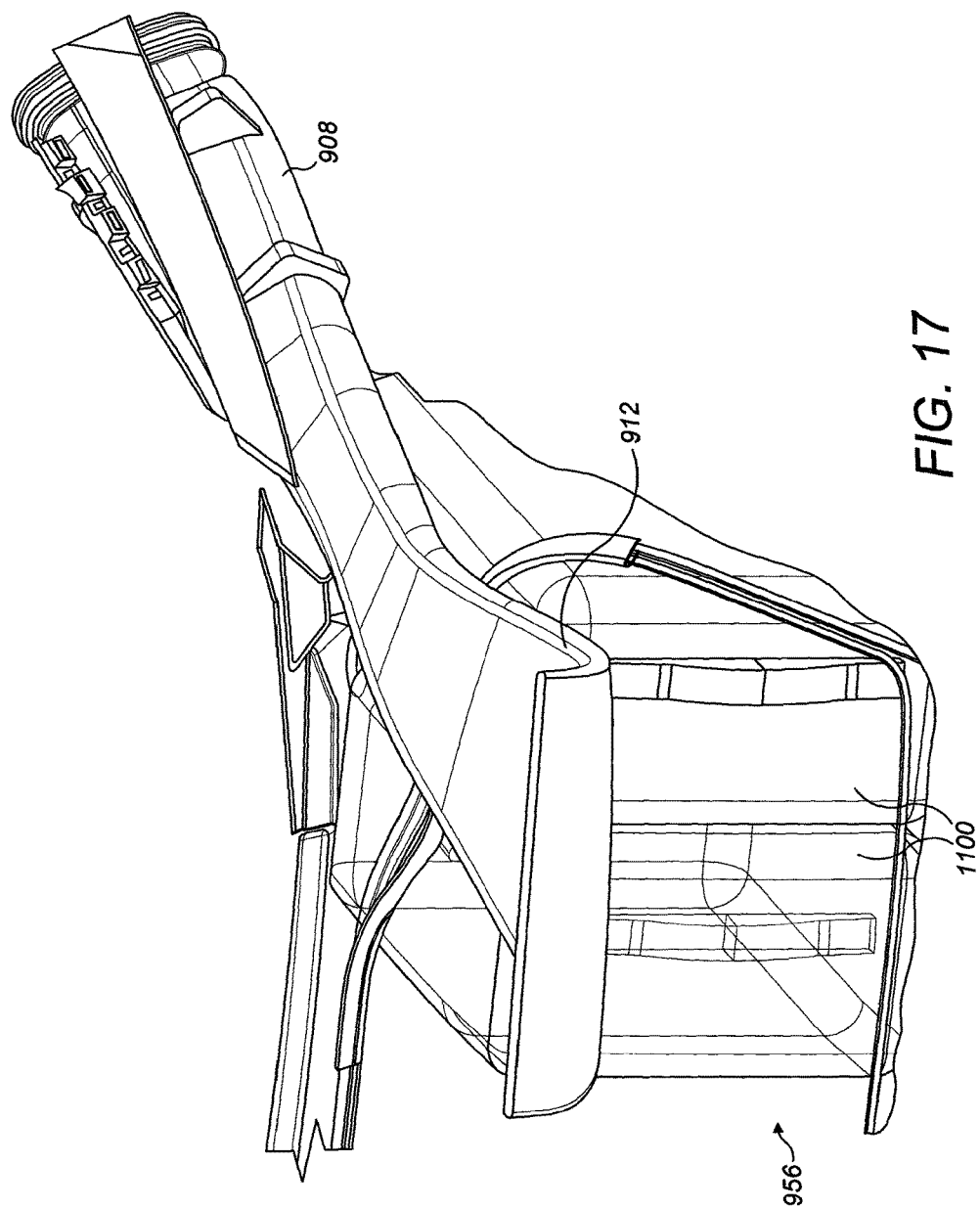
FIG. 17 schematically shows part of preferred air ducting of the arrangement of FIG. 14.

As shown in FIG. 17, although the ducting has more height and width at seal 928, there is a twist along main bodyside duct 930 and decklid duct 912 is wider than it is tall. This enables both good aerodynamic flow through the duct and allows good space for luggage 1100 in the trunk below duct 912.

The entire length of the ducting is designed such that in use the only low point inside the ducting is substantially at the drain hole 970 in the ducting bend section 972. This avoids the formation of puddles inside the ducting by ensuring that all rainwater or other water drains out either through the lower front edge 1112 of the inlet or through the drain holes 970 and down past the water shedder plate 960.

Through the ducting from the seal 928 all of the way to the exit bend 972 the cross sectional area of flow varies very little and indeed it is substantially constant. This provides for smooth controlled flow.

Various changes can be made to the embodiments described without departing from the invention.

The invention claimed is:

1. A vehicle airflow control apparatus comprising an air blowing arrangement located at or in a vehicle body surface for blowing air into flow passing the vehicle, in which the blowing arrangement is configured with at least one exit aperture thereof located in a movable vehicle surface panel which is movable relative to a fixed portion of vehicle bodywork, the blowing arrangement including ducting having an openable joint for permitting movement between the vehicle surface panel and the fixed portion of vehicle bodywork.

2. Apparatus as claimed in claim 1 in which the joint is located above a drainable section of the fixed vehicle of the section.

3. Apparatus as claimed in claim 1 in which the openable joint includes a wedge-shaped cup on one ducting element and a connector portion on another ducting element which is arranged to engage in the wedge-shaped cup.

4. Apparatus as claimed in claim 1 which has at least two said exit apertures, the blowing arrangement including a surface member configured to be positioned adjacent at least one said exit aperture with the surface member extending, in an extended configuration thereof, generally away from the vehicle body surface and extending laterally across the vehicle body surface, wherein at least two said exit apertures are connected by separate ducting to separate air inlets.

5. Apparatus as claimed in claim 4 in which at least one said exit aperture is arranged for connection by the ducting to an air inlet on a right side of the vehicle body surface and a further at least one said exit aperture is arranged for connection by the ducting to an air inlet on a left side of the vehicle body surface.

6. Apparatus as claimed in claim 1 in which the ducting has at least one flexible portion thereof.

7. Apparatus as claimed in claim 6 in which the flexible portion comprises a concertina element.

8. Apparatus as claimed in claim 1 in which the ducting has an air inlet which generally has a larger height than width and in which the ducting has at least a portion thereof spaced from said air inlet which has a larger width than height.

9. Apparatus as claimed in claim 1 in which cross sectional area of air flow through the ducting is substantially constant from an air inlet to said exit aperture.

10. Apparatus as claimed in claim 1 in which the ducting has at least one water drain configured to be positioned at a low point of the ducting.

11. Apparatus as claimed in claim 10 in which the ducting is configured with internal surfaces thereof contoured so as to drain from all points therein either to the air inlet or to the water drain.

12. Apparatus as claimed in claim 1 which includes a water shedder arrangement configured to be positioned below the vehicle body surface in order to divert water away from a space located below the water shedder arrangement.

13. Apparatus as claimed in claim 12 in which the water shedder arrangement includes at least one plate-like surface and in which the ducting is located passing through the plate-like surface.

14. Apparatus as claimed in claim 1 which includes an actuator for extending and retracting the surface member relative to the vehicle body surface.

15. Apparatus as claimed in claim 14 in which the actuator is arranged for drive of the surface member at a single central location.

16. Apparatus as claimed in claim 15 which includes an alignment system for aligning the surface member relative to the vehicle body surface in at least a raised or lowered configuration thereof.

17. Apparatus as claimed in claim 1 in which the blowing arrangement is passive, having airflow through the ductwork generated solely by motion relative to surrounding air; or in which at least one fan is provided for powering air through the ducting.

18. Apparatus as claimed in claim 4 in which the surface member is forwardly concave.

19. Apparatus as claimed in claim 1 in which the surface member is linearly movable between extended and retracted configurations thereof.

20. Apparatus as claimed in claim 1 in which the surface member has a cover flange arranged to overlie at least a portion of said exit aperture when the surface member is located in a retracted configuration thereof.

* * * * *